(12) United States Patent
Kwak

(10) Patent No.: US 12,513,904 B2
(45) Date of Patent: Dec. 30, 2025

(54) MEMORY DEVICE AND STORAGE DEVICE STORING DATA BASED ON INFORMATION OF MEMORY CELLS

(71) Applicant: SK hynix Inc., Gyeonggi-do (KR)

(72) Inventor: Dong Hun Kwak, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 147 days.

(21) Appl. No.: 18/452,573

(22) Filed: Aug. 21, 2023

(65) Prior Publication Data

US 2024/0315022 A1 Sep. 19, 2024

(30) Foreign Application Priority Data

Mar. 13, 2023 (KR) .................. 10-2023-0032495

(51) Int. Cl.
| | |
|---|---|
| *G11C 16/04* | (2006.01) |
| *G06F 3/06* | (2006.01) |
| *G11C 11/56* | (2006.01) |
| *G11C 16/10* | (2006.01) |
| *H10B 41/27* | (2023.01) |
| *H10B 41/41* | (2023.01) |
| *H10B 43/27* | (2023.01) |
| *H10B 43/40* | (2023.01) |

(52) U.S. Cl.
CPC ............ *H10B 43/27* (2023.02); *G06F 3/061* (2013.01); *G06F 3/0658* (2013.01); *G06F 3/0679* (2013.01); *G11C 11/5628* (2013.01); *G11C 11/5671* (2013.01); *G11C 16/0483* (2013.01); *G11C 16/10* (2013.01); *H10B 41/27* (2023.02); *H10B 41/41* (2023.02); *H10B 43/40* (2023.02)

(58) Field of Classification Search
CPC ........ H10B 43/27; H10B 41/27; H10B 41/41; H10B 43/40; G06F 3/061; G06F 3/0658; G06F 3/0679; G11C 11/5628; G11C 11/5671; G11C 16/0483; G11C 16/10; G11C 16/08; G11C 16/12; G11C 16/14; G11C 16/3436; G11C 7/18; G11C 8/14
USPC ..................................... 365/185.03
See application file for complete search history.

(56) References Cited

U.S. PATENT DOCUMENTS

| | | | | |
|---|---|---|---|---|
| 8,054,683 | B2 * | 11/2011 | Tanaka .................. | G11C 16/30 365/185.26 |
| 8,446,771 | B2 * | 5/2013 | Horii .................. | G11C 16/0483 365/185.18 |
| 10,811,105 | B2 * | 10/2020 | Futatsuyama .......... | H10B 43/35 |

FOREIGN PATENT DOCUMENTS

| | | |
|---|---|---|
| KR | 10-2015-0108179 A | 9/2015 |
| KR | 10-2019-0001624 A | 1/2019 |
| KR | 10-2019-0084408 A | 7/2019 |

* cited by examiner

*Primary Examiner* — Tha-O H Bui
(74) *Attorney, Agent, or Firm* — IP & T GROUP LLP

(57) ABSTRACT

A memory device may include a memory cell array including memory cells stacked in a direction perpendicular to a substrate, each of the memory cells including a first sub-memory cell and a second sub-memory cell having a size larger than a size of the first sub-memory cell, a sub-memory cell information storage configured to store sub-memory cell size information on the sizes of the first sub-memory cell and the second sub-memory cell, a peripheral circuit configured to perform a program operation on a selected sub-memory cell among the memory cells, and a control logic configured to control the peripheral circuit to store data in each of the first sub-memory cell and the second sub-memory cell based on the sub-memory cell size information.

20 Claims, 19 Drawing Sheets

MEMORY DEVICE AND STORAGE DEVICE STORING DATA BASED ON INFORMATION OF MEMORY CELLS

CROSS-REFERENCE TO RELATED APPLICATION

The present application claims priority under 35 U.S.C. § 119(a) to Korean patent application number 10-2023-0032495 filed on Mar. 13, 2023, the entire disclosure of which is incorporated by reference herein.

BACKGROUND

1. Field of Invention

Embodiments of the present disclosure relate to a memory device and a storage device.

2. Description of Related Art

A memory device may be a device for storing data, and may be classified into a volatile memory device and a nonvolatile memory device.

The memory device may include a memory cell array. The memory cell array may include a stack in which a plurality of insulating layers and a plurality of conductive layers are alternately stacked, and a channel structure passing through the stack. A three-dimensional memory device may form a plurality of channels by dividing one channel structure into two or more channels through a cutting structure. Accordingly, since two or more memory cells may be formed along the channel structure within one layer of conductive layer, an integration degree of memory cells may be increased.

However, a size of a plurality of memory cells formed by cutting one channel structure may be asymmetrical, and thus a method capable of optimizing and controlling memory cells having different sizes is required.

SUMMARY

Embodiments of the present disclosure provide a memory device and a storage device capable of optimally controlling memory cells having different sizes.

According to an embodiment of the present disclosure, a memory device may include a memory cell array including memory cells stacked in a direction perpendicular to a substrate, each of the memory cells including a first sub-memory cell and a second sub-memory cell having a size larger than a size of the first sub-memory cell, a sub-memory cell information storage configured to store sub-memory cell size information on the sizes of the first sub-memory cell and the second sub-memory cell, a peripheral circuit configured to perform a program operation on a selected sub-memory cell among the memory cells, and a control logic configured to control the peripheral circuit to store data in each of the first sub-memory cell and the second sub-memory cell based on the sub-memory cell size information. At least a portion of the plurality of first sub-memory cells may be connected to a first channel extending in the direction perpendicular to the substrate, and wherein at least a portion of the plurality of second sub-memory cells may be connected to a second channel extending in the direction perpendicular to the substrate.

According to an embodiment of the present disclosure, a storage device may include a memory device including memory cells each including a first sub-memory cell and a second sub-memory cell having a size larger than a size of the first sub-memory cell, and configured to store sub-memory cell size information on the sizes of the first sub-memory cell and the second sub-memory cell; and a memory controller configured to: receive a write request for requesting to store data in the memory device and write data corresponding to the write request, and control the memory device to store therein the write data based on the sub-memory cell size information. At least a portion of the first sub-memory cells included in the memory cells is connected to a first channel extending in a direction in which the memory cells are stacked, and at least a portion of the second sub-memory cells included in the memory cells is connected to a second channel extending in the direction in which the memory cells are stacked.

According to an embodiment of the present disclosure, a memory device may include a memory cell structure physically divided into first and second sub-memory cells of physically different sizes; and a control circuit configured to perform, based on the sizes, different program operations on the respective first and second sub-memory cells by allowing different numbers of threshold voltage distributions and different widths of program/erase window between the first and second sub-memory cells. The first and second sub-memory cells are coupled to respective first and second sub-channels, which are physically divided from a channel structure coupled to the memory cell structure.

According to the present technology, a memory device and a storage device capable of optimally controlling memory cells having different sizes are provided.

DETAILED DESCRIPTION

Specific structural or functional descriptions of embodiments according to the concept of the present disclosure disclosed in the present specification are illustrated only to describe the embodiments according to the concept of the present disclosure. The embodiments according to the concept of the present disclosure may be carried out in various forms and are not limited to the embodiments described in the present specification.

Figure 1:
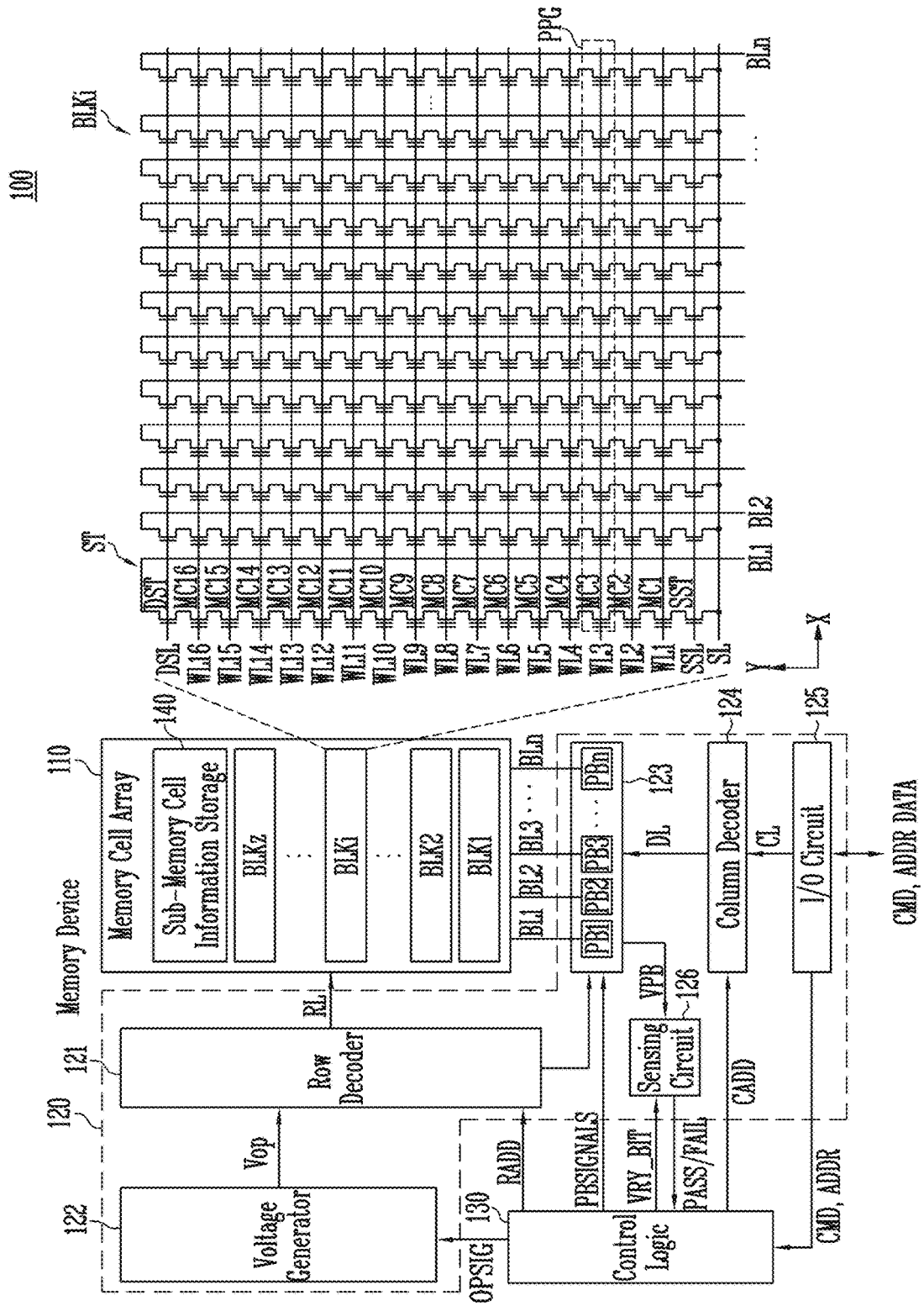
FIG. 1 is a block diagram illustrating a memory device according to an embodiment of the present disclosure.

FIG. 1 is a block diagram illustrating a memory device 100 according to an embodiment of the present disclosure.

Referring to FIG. 1, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be connected to a row decoder 121 through row lines RL. Here, the row lines RL may include at least one source select line, a plurality of word lines, and at least one drain select line. The plurality of memory blocks BLK1 to BLKz may be connected to a page buffer group 123 through bit lines BL1 to BLn. Each of the plurality of memory blocks BLK1 to BLKz may include a plurality of memory cells. In an embodiment, the plurality of memory cells may be nonvolatile memory cells. Memory cells connected to the same word line may be defined as one page. Therefore, one memory block may include a plurality of pages.

In a memory block BLKi among the plurality of memory blocks, a plurality of word lines arranged in parallel with each other may be connected between a first select line and a second select line. Here, the first select line may be a source select line SSL, and the second select line may be a drain select line DSL. More specifically, the memory block BLKi may include a plurality of strings ST connected between bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16 or more memory cells than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to a plurality of word lines WL1 to WL16. A group of the memory cells connected to the same word line among the memory cells included in different strings ST may be referred to as a physical page PPG. Therefore, the memory block BLKi may include the physical pages PPG of the number of the word lines WL1 to WL16.

Each of the memory cells included in the memory cell array 110 may be configured as a single level cell (SLC) that stores one data bit, a multi-level cell (MLC) that stores two data bits, a triple level cell (TLC) that stores three data bits, or a quad level cell (QLC) that stores four data bits.

The SLC may store one bit of data. One physical page PPG of the SLC may store one logical page data. One logical page LPG data may include data bits corresponding to the number of cells included in one physical page PPG.

The MLC, the TLC, and the QLC may store two or more bits of data. In this case, one physical page PPG may store two or more logical page data.

The memory cells may be divided into two or more sub-memory cells. Sizes of the sub-memory cells may be different from each other. For example, each of the memory cells may include a first sub-memory cell and a second sub-memory cell having a size larger than that of the first sub-memory cell. The memory cells are described in detail with reference to FIGS. 2 and 3 below.

In addition, the memory device 100 may include a sub-memory cell information storage 140. The sub-memory cell information storage 140 may store sub-memory cell size information on the sizes of the first sub-memory cell and the second sub-memory cell. The sub-memory cell size information may be stored in advance. In an embodiment, the sub-memory cell size information may be obtained in advance by comparing cross-sectional areas from an image of the memory cells in advance. In another embodiment, the sub-memory cell size information may be obtained in advance based on a size of a current flowing as a voltage is applied to the sub-memory cells. In still another embodiment, the sub-memory cell size information may be obtained in advance based on a threshold voltage change degree according to application of a program voltage. In still another embodiment, the sub-memory cell size information may be obtained in advance based on a result of performing incremental step pulse programming (ISPP). However, a method of obtaining the sub-memory cell size information is not limited to the above-described examples. In an embodiment, the sub-memory cell size information may include information indicating the sizes of the first sub-memory cells and the second sub-memory cells included in each of the memory cells. In another embodiment, the sub-memory cell size information may include information indicating a size difference between the first sub-memory cells and the second sub-memory cells included in each of the memory cells.

In FIG. 1, the sub-memory cell information storage 140 is shown as being included in the memory cell array 110, but is not limited thereto, and the sub-memory cell information storage 140 may also be a separate storage area formed outside the memory cell array 110.

The peripheral circuit 120 may be configured to perform a program operation, a read operation, or an erase operation on the selected area of the memory cell array 110 under control of the control logic 130. That is, the peripheral circuit 120 may drive the memory cell array 110 under the control of the control logic 130. For example, the peripheral circuit 120 may apply various operation voltages to the row lines RL and the bit lines BL1 to BLn or discharge the applied voltages under the control of the control logic 130.

Specifically, the peripheral circuit 120 may include a row decoder 121, a voltage generator 122, a page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In addition, the row lines RL may further include a pipe select line.

The row decoder 121 may be configured to operate in response to the control of the control logic 130. The row decoder 121 may receive a row address RADD from the control logic 130. Specifically, the row decoder 121 may be configured to decode the row address RADD. The row decoder 121 may select at least one of the memory blocks BLK1 to BLKz according to a decoded row address RADD. In addition, the row decoder 121 may select at least one word line of the memory block selected to apply the voltages generated by the voltage generator 122 to at least one word line according to the decoded address.

For example, during the program operation, the row decoder 121 may apply the program voltage to a selected word line and apply a program pass voltage of a level lower than that of the program voltage to an unselected word line. During a program verify operation, the row decoder 121 may apply a verify voltage to the selected word line and a verify pass voltage higher than the verify voltage to the unselected word line. During the read operation, the row decoder 121 may apply a read voltage to the selected word line and apply a read pass voltage of a level higher than the read voltage to the unselected word line.

In an embodiment, the erase operation of the memory cell array 110 may be performed in a memory block unit. During the erase operation, the row decoder 121 may select one memory block according to the decoded address, and the row decoder 121 may apply a ground voltage to word lines connected to the selected memory block.

The voltage generator 122 may operate in response to the control of the control logic 130. The voltage generator 122 may be configured to generate a plurality of voltages using an external power voltage supplied to the memory device 100. For example, the voltage generator 122 may generate the program voltage, the verify voltage, the pass voltage, the read voltage, the erase voltage, and the like in response to the control of the control logic 130. That is, the voltage generator 122 may generate various operation voltages Vop used for the program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages using the external power voltage or the internal power voltage. For example, the voltage generator 122 may include a plurality of pumping capacitors that receive the internal power voltage, and may selectively activate the plurality of pumping capacitors to generate the plurality of voltages, in response to the control of the control logic 130. In addition, the generated voltages may be supplied to the memory cell array 110 by the row decoder 121.

The page buffer group 123 may include first to n-th page buffers PB1 to PBn. The first to n-th page buffers PB1 to PBn may be connected to the memory cell array 110 through the first to n-th bit lines BL1 to BLn, respectively. In addition, the first to n-th page buffers PB1 to PBn may operate in response to the control of the control logic 130. Specifically, the first to n-th page buffers PB1 to PBn may operate in response to page buffer control signals PBSIGNALS. For example, the first to n-th page buffers PB1 to PBn may temporarily store data received through the first to n-th bit lines BL1 to BLn, or may sense a voltage or a current of the bit lines BL1 to BLn during the read or verify operation.

Specifically, during the program operation, when a program pulse is applied to the selected word line, the first to n-th page buffers PB1 to PBn may transfer data DATA received through the input/output circuit 125 to the selected memory cells through the first to n-th bit lines BL1 to BLn. The memory cells of the selected page may be programmed according to the transferred data DATA. Memory cells of a page selected according to the transferred data DATA may be programmed. A memory cell connected to a bit line to which a program allowable voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to n-th page buffers PB1 to PBn may read page data from the selected memory cells through the first to n-th bit lines BL1 to BLn.

The column decoder 124 may transfer data between the input/output circuit 125 and the page buffer group 123 in response to a column address CADD. For example, the column decoder 124 may exchange data with the first to n-th page buffers PB1 to PBn through data lines DL, or may exchange data with the input/output circuit 125 through column lines CL.

The input/output circuit 125 may transfer the command CMD and the address ADDR received from the memory controller 200 to the control logic 130, or may exchange the data DATA with the column decoder 124.

The sensing circuit 126 may generate a reference current in response to an allowable bit signal VRY_BIT during the read operation or the verify operation, and compare a sensing voltage VPB received from the page buffer group 123 with a reference voltage generated by the reference current to output a pass signal PASS or a fail signal FAIL.

The control logic 130 may output the operation signal OPSIG, the row address RADD, the page buffer control signals PBSIGNALS, and the allowable bit signal VRY_BIT in response to the command CMD and the address ADDR to control the peripheral circuit 120. In an embodiment, the control logic 130 may control the peripheral circuit 120 to store data in the sub-memory cells in the memory cell array 110 based on the sub-memory cell size information stored in the sub-memory cell information storage 140.

In an embodiment, the control logic 130 may control the peripheral circuit 120 so that the number of bits to be stored in the second sub-memory cell is greater than the number of bits to be stored in the first sub-memory cell. In another embodiment, the control logic 130 may control the peripheral circuit 120 so that the number of threshold voltage distributions corresponding to states in which the second sub-memory cells are to be programmed is greater than the number of threshold voltage distributions corresponding to states in which the first sub-memory cells are to be programmed. In still another embodiment, the peripheral circuit 120 may be controlled so that a program/erase window width of the second sub-memory cells is greater than a program/erase window width of the first sub-memory cells.

The control logic 130 may control the peripheral circuit 120 to store data in the memory cells by additionally considering information on factors affecting a size difference or a characteristic difference of the sub-memory cells. For example, control logic 130 may further consider information on an address of the memory blocks, information on the number of layers of the word lines, information on the number of erase/program cycles of the memory blocks, and information on a position of memory dies. The information on the address of the memory blocks, the information on the number of layers of the word lines, the information on the number of erase/program cycles of the memory blocks, the information on the position of the memory dies, and the like may be stored in the memory cell array 110 or the sub-memory cell information storage 140, or may be received from an external memory controller.

Figure 2:
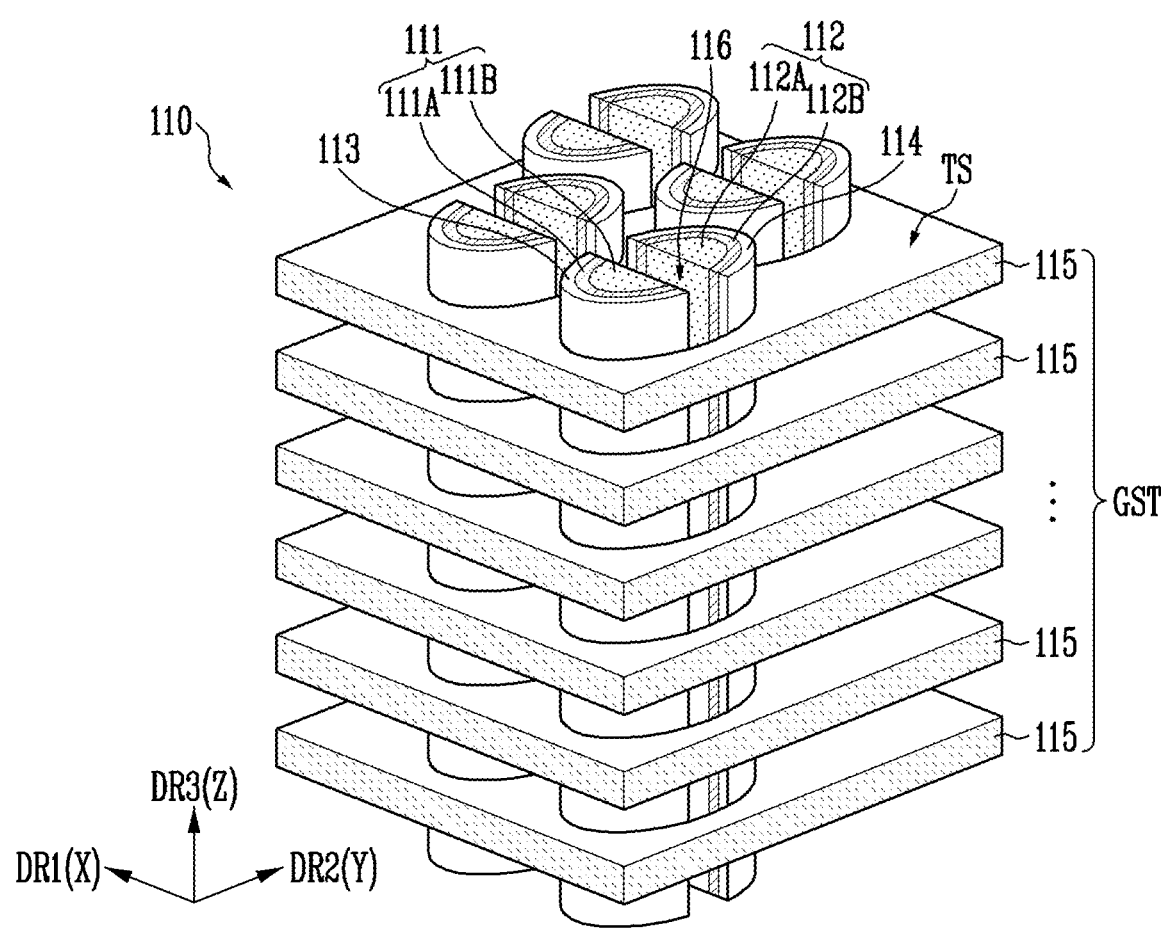
FIG. 2 is a perspective view illustrating a memory cell array included in the memory device of FIG. 1.

FIG. 2 is a perspective view illustrating the memory cell array included in the memory device of FIG. 1.

Referring to FIGS. 1 and 2, the memory device 100 may include the memory cell array 110 connected to a plurality of bit lines BL. The memory cell array 110 may be provided as a three-dimensional memory cell array. To this end, the memory cell array 110 may include a gate stack GST including a plurality of conductive layers 115, a plurality of channels 111 and 112 passing through the gate stack GST, and a plurality of memory layers 113 and 114 between the plurality of channels 111 and 112 and the gate stack GST. Each of the plurality of channels 111 and 112 may include a channel layer 111A or 112B and a core insulating layer 111B or 112A.

Each of the conductive layers 115 may have a flat plate shape extending along a first direction DR1 and a second direction defined with reference to FIG. 2. An upper surface TS of each conductive layer 115 may extend along the first direction DR1 and the second direction DR2 and may face a third direction DR3 defined with reference to FIG. 2. The third direction DR3 defined with reference to FIG. 2 may be a direction perpendicular to a substrate and may be a direction in which the memory cells are stacked.

The plurality of conductive layers 115 may be spaced apart from each other in the third direction DR3 and stacked. The plurality of conductive layers 115 may be provided as at least one layer of source select line SSL, the plurality of word lines WL1 to WL16, and at least one layer of drain select line DSL shown in FIG. 1. Each conductive layer 115 may include at least one of a doped semiconductor layer, a metal layer, and a conductive metal nitride layer. The doped semiconductor layer may include a doped silicon layer. The metal layer may include tungsten, copper, molybdenum, and the like. The conductive metal nitride layer may include titanium nitride, tantalum nitride, and the like.

The gate stack GST may include a plurality of channel holes 116. The plurality of channel holes 116 may extend in the third direction DR3 to pass through the plurality of conductive layers 115. In order to increase a disposition density in the gate stack GST, the plurality of channel holes 116 may be arranged in a zigzag pattern.

The plurality of channels 111 and 112 may include a plurality of first channels 111 and a plurality of second channels 112. Among the channels 111 and 112, a single first channel 111 and a single second channel 112 may configure a pair. The plurality of pairs of the plurality of first channels 111 and the plurality of second channels 112 may correspond to the plurality of channel holes 116. The first channel 111 and the second channel 112 of each pair may be arranged spaced apart from each other in the second direction DR2 inside the channel hole 116 corresponding thereto. In an embodiment, the first channel 111 and the second channel 112 of each pair may be physically separated from one channel structure. In an embodiment, one channel structure may be separated into the first channel 111 and the second channel 112 by cutting.

The plurality of memory layers 113 and 114 may include a plurality of first memory layers 113 and a plurality of second memory layers 114 configuring a plurality of pairs. The plurality of pairs of the plurality of first memory layers 113 and the plurality of second memory layers 114 may correspond to the plurality of channel holes 116. The first memory layer 113 and the second memory layer 114 of each pair may be spaced apart from each other in the second direction DR2 inside the channel hole 116 corresponding thereto.

The plurality of pairs of the plurality of first memory layers 113 and the plurality of second memory layers 114 may correspond to the plurality of pairs of the plurality of first channels 111 and the plurality of second channels 112. The first memory layer 113 may be disposed between the first channel 111 corresponding thereto and the gate stack GST, and the second memory layer 114 may be disposed between the second channel 112 corresponding thereto and the gate stack GST.

The plurality of memory cells of the memory cell array 110 may be provided at intersections of the word lines among the plurality of conductive layers 115 and a channel structure. However, as the channel structure is divided into the first channel 111 and the second channel 112, the first sub-memory cells and the second sub-memory cells included in the memory cells may be provided at intersections of the word lines among the plurality of conductive layers 115 and the first channel 111, and intersections of the word lines and the second channel 112. Since the first channel 111 and the second channel 112 of each pair are spaced apart from each other within the same channel hole 116, a memory cell string defined along the first channel 111 and a memory cell string defined along the second channel 112 may be individually controlled. The first channel 111 and the second channel 112 of each pair may be surrounded with each conductive layer 115. That is, the conductive layer 115 may successively extend to surround the first channel 111 and the second channel 112 of each pair in a plane on which the conductive layer 115 is disposed. In an embodiment, the conductive layer 115 may extend along an XY plane to surround the first channel 111 and the second channel 112 of each pair. Accordingly, the first channel 111 and the second channel 112 of each pair may be controlled by the same conductive layer 115.

Figure 3:
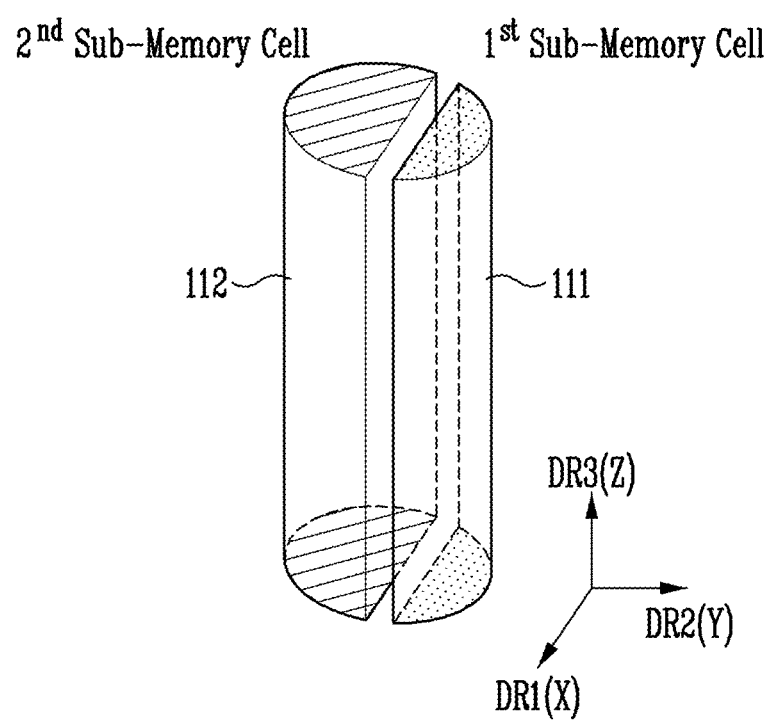
FIG. 3 is a diagram illustrating a memory cell included in the memory cell array of FIG. 2 in detail.

FIG. 3 is a diagram illustrating the memory cell included in the memory cell array of FIG. 2 in detail.

Referring to FIGS. 2 and 3, the first channel 111 and the second channel 112 may be physically separated from one channel structure. The first sub-memory cell may be formed to be connected to the first channel 111. For example, the first sub-memory cell may be formed on one end surface of the first channel 111. The second sub-memory cell may be formed to be connected to the second channel 112. For example, the second sub-memory cell may be formed on one end surface of the second channel 112.

However, when one channel structure is separated into the first channel 111 and the second channel 112 by cutting, a cross section of the first channel 111 and a cross section of the second channel 112 may not be perfectly symmetrical, and thus sizes of the first sub-memory cell and the second sub-memory cell may be different from each other. In an embodiment, a sub-memory cell having a relatively small size may be referred to as the first sub-memory cell, and a sub-memory cell having a relatively large size may be referred to as the second sub-memory cell.

As described above, the first channel and the second channel may extend in the third direction. The third direction may be a direction in which the memory cells are stacked in the direction perpendicular to the substrate. Each of the first sub-memory cell and the second sub-memory cell may be formed on the XY plane perpendicular to the third direction.

Figure 4A:
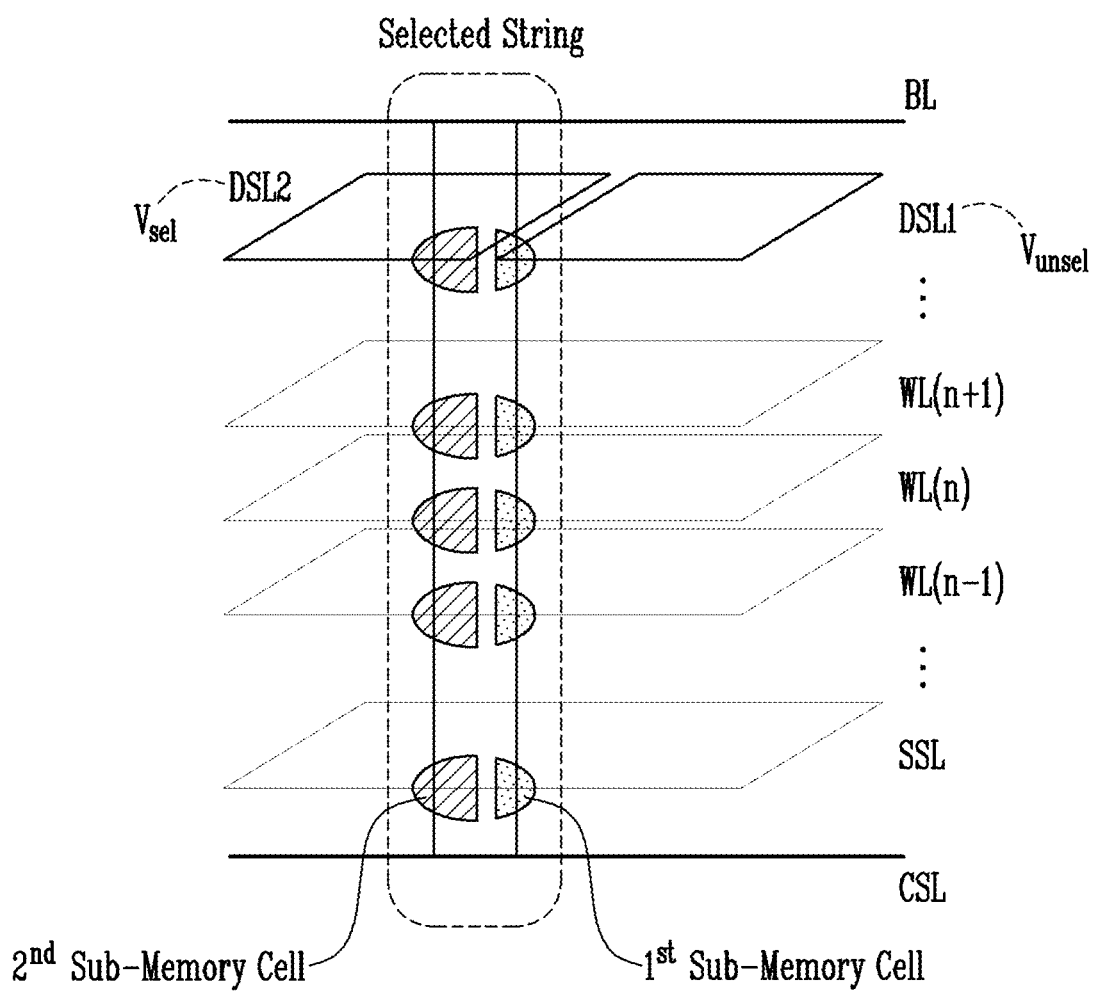
FIGS. 4A and 4B are diagrams illustrating a connection structure of a memory cell array according to an embodiment of the present disclosure.
Figure 4B:
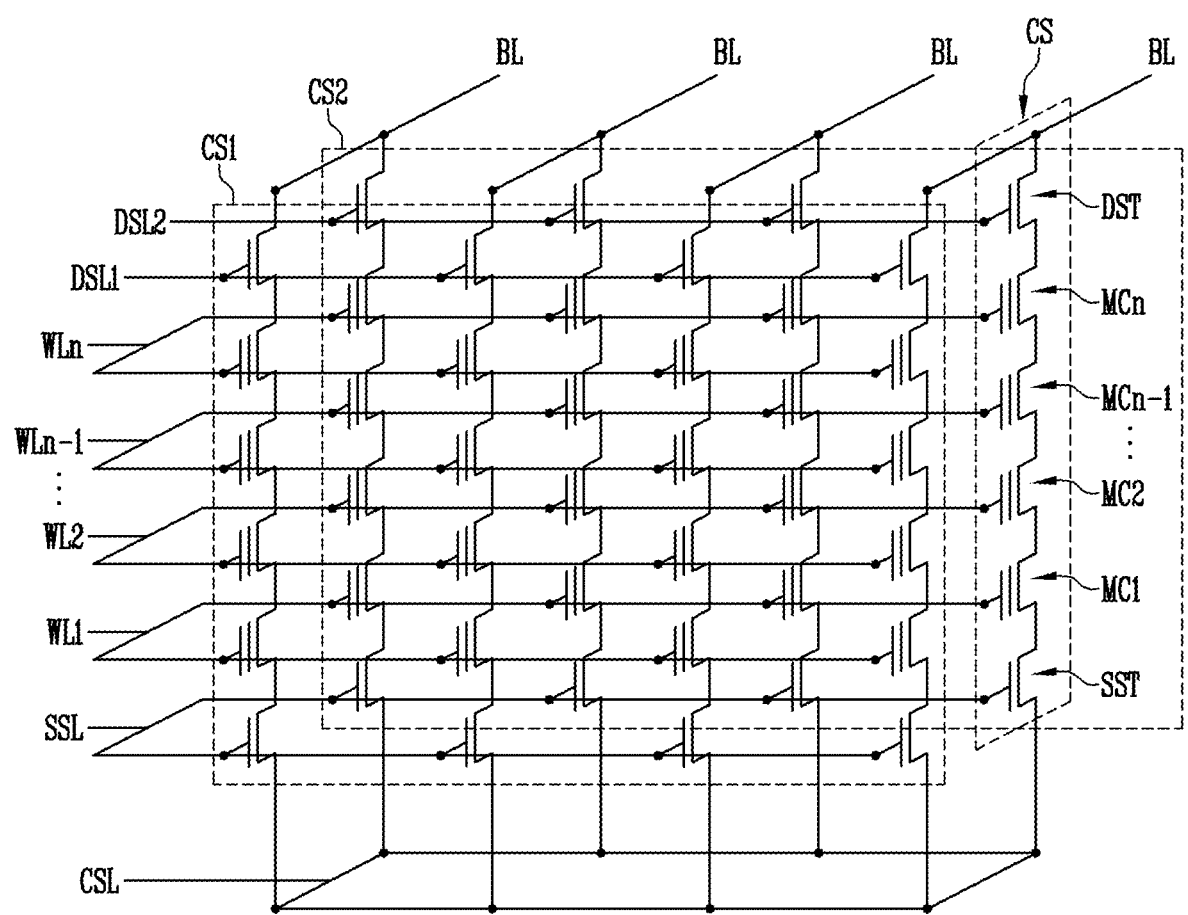

FIGS. 4A and 4B are diagrams illustrating a connection structure of a memory cell array according to an embodiment of the present disclosure.

Referring to FIGS. 4A and 4B, the first sub-memory cell and the second sub-memory cell may be connected to different drain select lines DSL1 or DSL2.

Sub-memory cells connected to the first drain select line DSL1 in a selected string, may form a first cell string CS1. That is, the first sub-memory cells may form the first cell string CS1.

Sub-memory cells connected to the second drain select line DSL2 in the selected string may form a second cell string CS2. That is, the second sub-memory cells may form the second cell string CS2.

Therefore, the first cell string CS1 and the second cell string CS2 may be individually controlled by the drain select lines DSL1 or DSL2 separated from each other. For example, when the second cell strings CS2 including the second sub-memory cells are to be selected from among the selected strings, a select voltage $V_{sel}$ for selecting sub-memory cells connected to the second drain select line DSL2 may be applied to the second drain select line DSL2, and an unselect voltage $V_{unsel}$ for unselecting sub-memory cells connected to the first drain select line DSL1 may be applied to the first drain select line DSL1. Here, the select voltage and the unselect voltage merely mean voltages applied to drain select lines in order to select or unselect a connected cell string, respectively, and are not limited to a specific value.

Accordingly, the first cell string CS1 formed by the first sub-memory cells and the second cell string CS2 formed by the second sub-memory cells may be divided and controlled through different drain select lines DSL1 and DSL2.

A plurality of memory cell strings CS may be connected to a common source line CSL in parallel. Each memory cell string CS may be connected to one bit line corresponding thereto among the plurality of bit lines BL. In addition, the first cell string CS1 and the second cell string CS2 may be connected to the same source select line SSL. That is, the common source line CSL, the plurality of bit lines BL, and the source select line SSL may be connected to a plurality of memory cell strings CS. For example, the first cell string CS1 and the second cell string CS2 may be connected to the common source line CSL, the same bit line BL, and the same source select line SSL.

In another embodiment, two or more cell strings CS1 and CS2 connected to the same bit line BL may be connected to the same drain select line and may be connected to two or more source select lines separated from each other, respectively. In still another embodiment, two or more cell strings connected to the same bit line BL may be connected to two or more drain select lines separated from each other, respectively, and may be connected to two or more source select lines separated from each other, respectively.

Figure 5A:
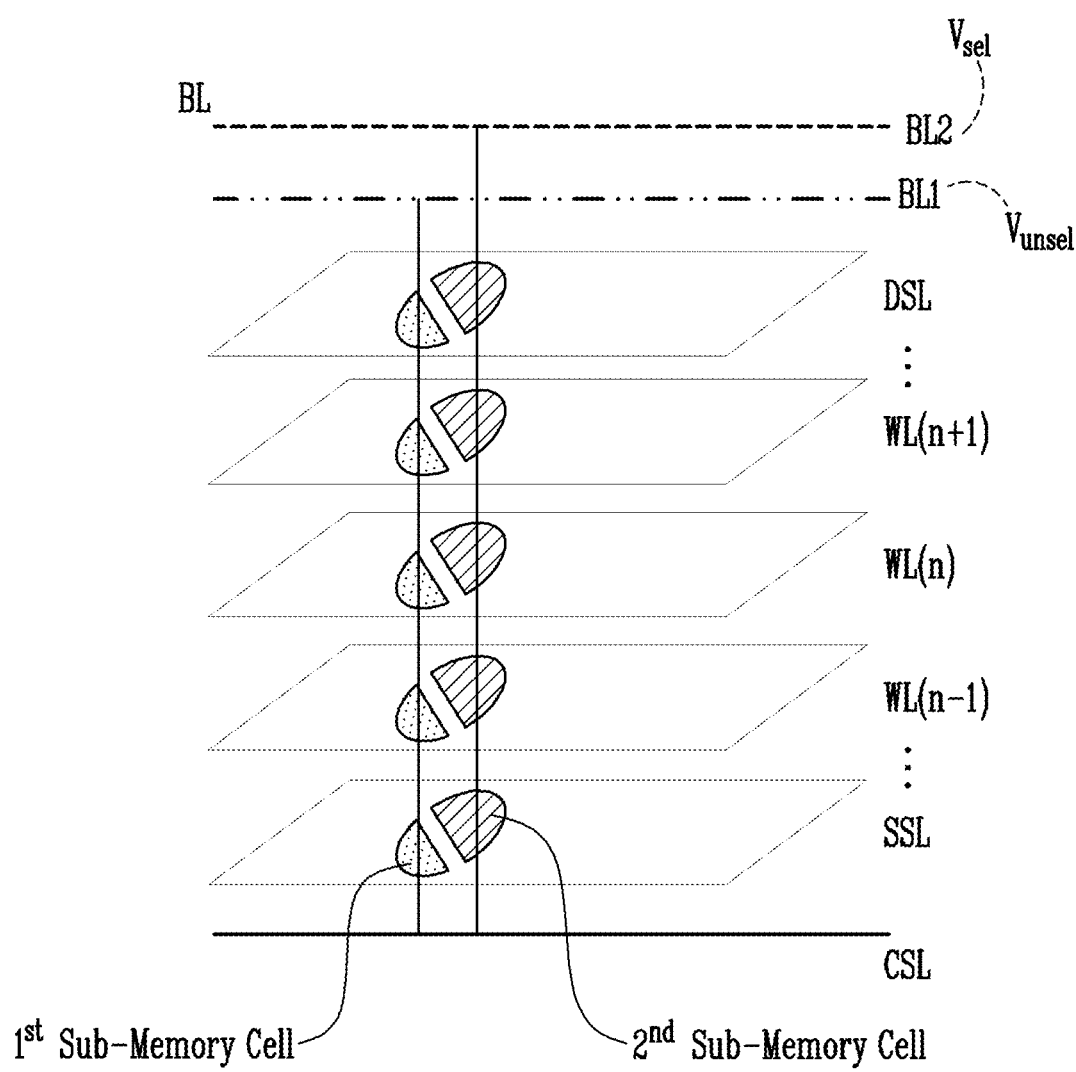
FIGS. 5A and 5B are diagrams illustrating a connection structure of a memory cell array according to another embodiment of the present disclosure.
Figure 5B:
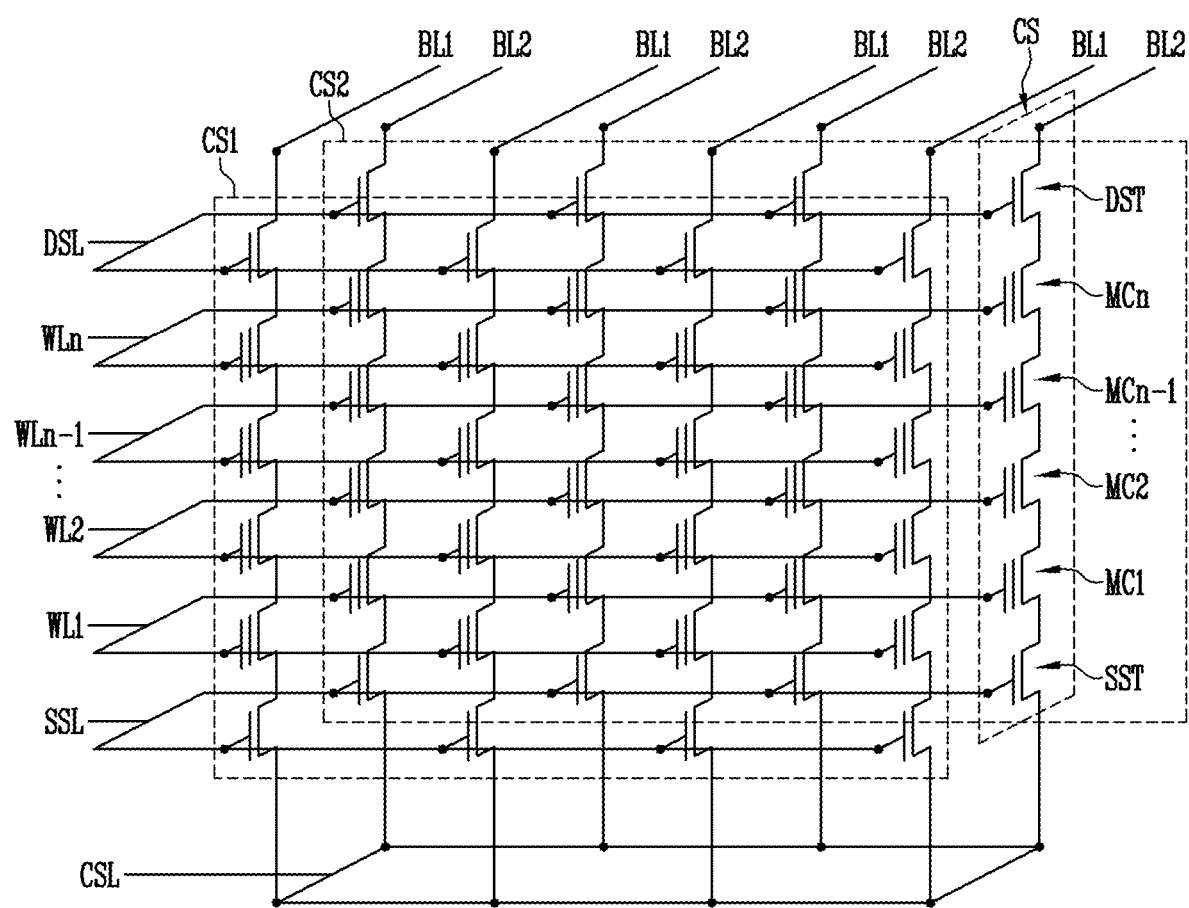

FIGS. 5A and 5B are diagrams illustrating a connection structure of a memory cell array according to another embodiment of the present disclosure.

Referring to FIGS. 5A and 5B, the first sub-memory cell and the second sub-memory cell may be connected to different bit lines BL1 or BL2.

Sub-memory cells connected to the first bit line BL1 in the selected string may form the first cell string CS1. That is, the first sub-memory cells may form the first cell string CS1.

Sub-memory cells connected to the second bit line BL2 in the selected string may form the second cell string CS2. That is, the second sub-memory cells may form the second cell string CS2.

Therefore, the first cell string CS1 and the second cell string CS2 may be individually controlled by the bit lines BL1 or BL2 separated from each other. For example, when the second cell strings CS2 including the second sub-memory cells are to be selected from among the selected strings, a select voltage $V_{sel}$ for selecting sub-memory cells connected to the second bit line BL2 may be applied to the second bit line BL2, and an unselect voltage $V_{unsel}$ for unselecting sub-memory cells connected to the first bit line BL1 may be applied to the first bit line BL1. Here, the select voltage and the unselect voltage merely mean voltages applied to bit lines in order to select or unselect connected sub-memory cells, respectively, and are not limited to a specific value.

Accordingly, the first cell string CS1 formed by the first sub-memory cells and the second cell string CS2 formed by the second sub-memory cells may be divided and controlled through different bit lines BL1 and BL2.

The plurality of memory cell strings CS may be connected to the common source line CSL in parallel. The first cell string CS1 and the second cell string CS2 may be connected to the same source select line SSL. In addition, the first cell string CS1 and the second cell string CS2 may be connected to the same drain select line DSL. That is, the common source line CSL, the source select line SSL, and the drain select line DSL may be connected to the plurality of memory cell strings CS. For example, the first cell string CS1 and the second cell string CS2 may be connected to the common source line CSL, the same source select line SSL, and the same drain select line DSL.

Figure 6A:
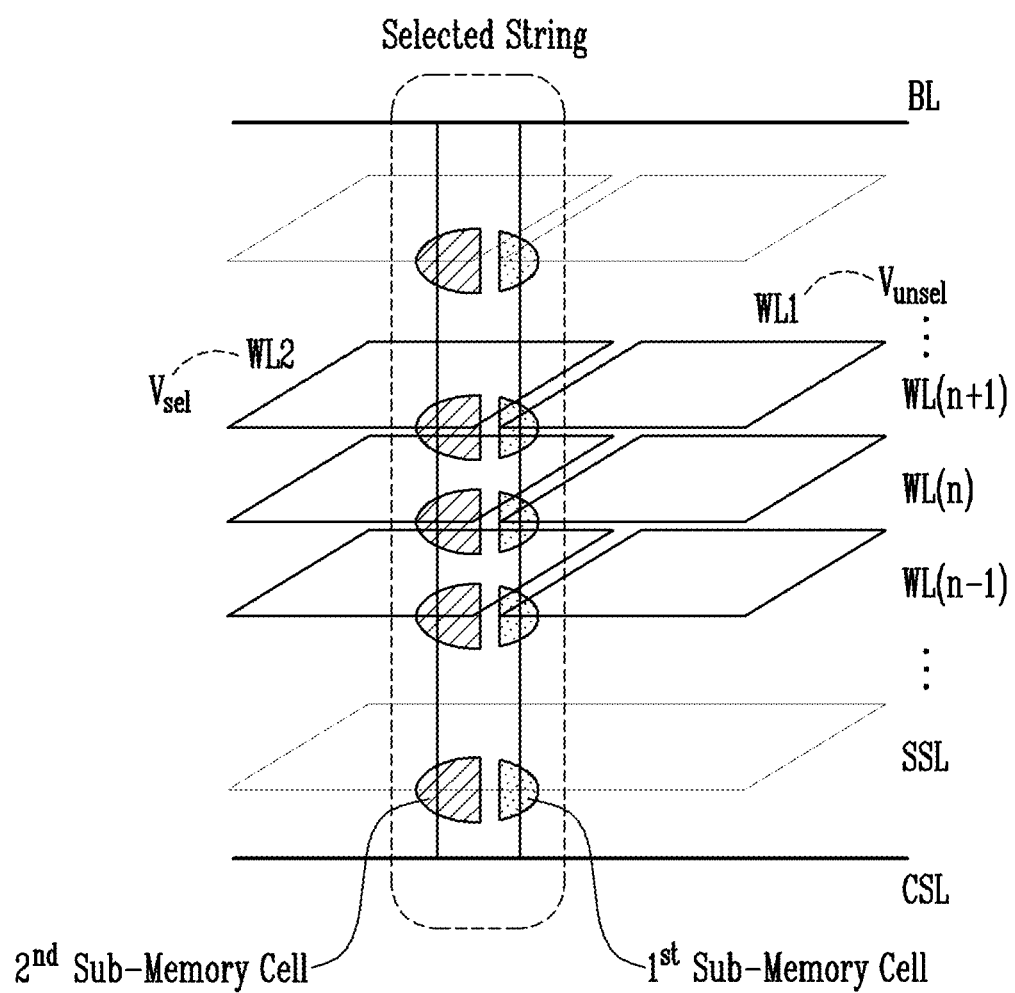
FIGS. 6A and 6B are diagrams illustrating a connection structure of a memory cell array according to still another embodiment of the present disclosure.
Figure 6B:
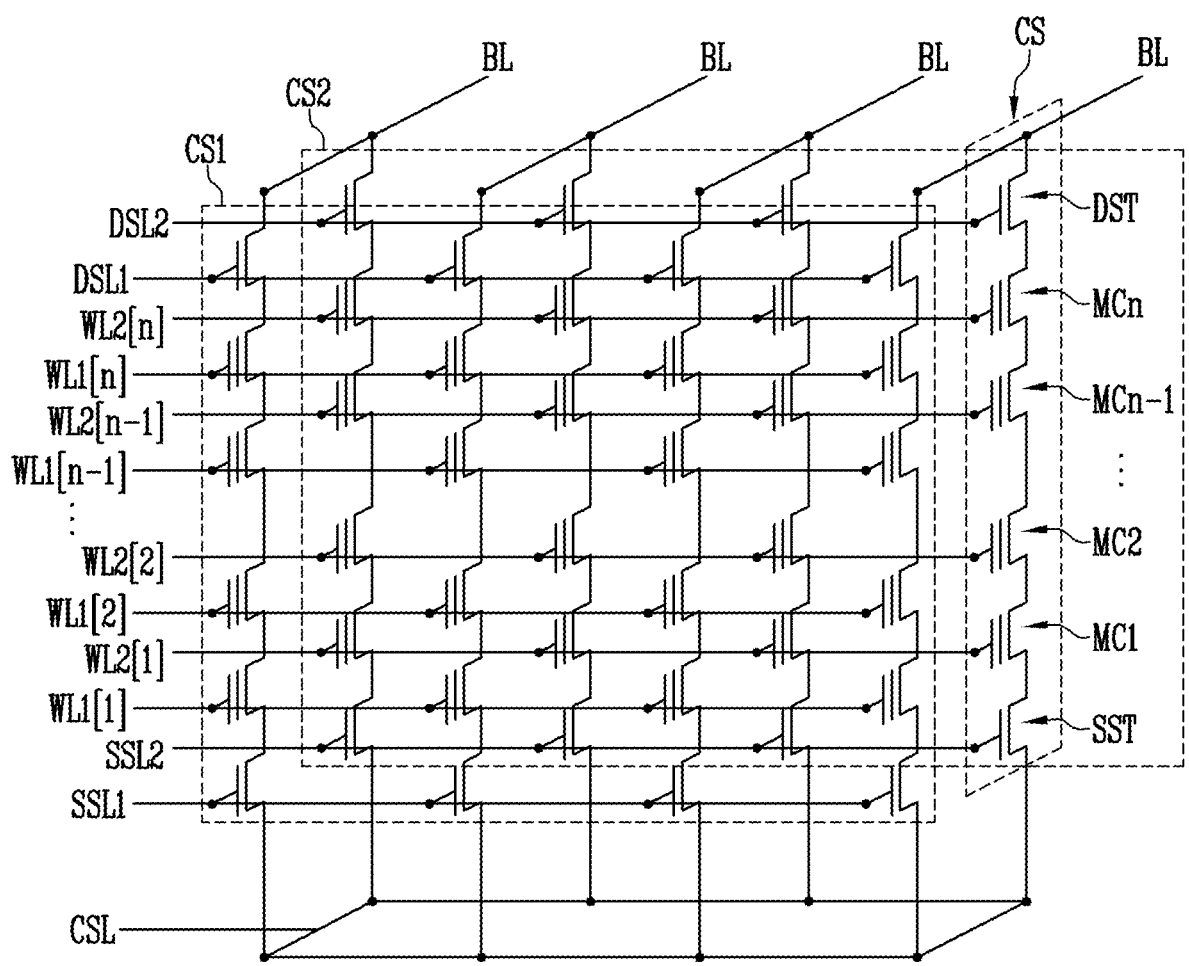

FIGS. 6A and 6B are diagrams illustrating a connection structure of a memory cell array according to still another embodiment of the present disclosure.

Referring to FIGS. 6A and 6B, the first sub-memory cell and the second sub-memory cell may be connected to different word lines WL1 or WL2.

Sub-memory cells connected to first word lines WL1[1] to WL1[n] in the selected string may form the first cell string CS1. That is, the first sub-memory cells may form the first cell string CS1.

Sub-memory cells connected to second word lines WL2[1] to WL2[n] in the selected string may form the second cell string CS2. That is, the second sub-memory cells may form the second cell string CS2.

Therefore, the first cell string CS1 and the second cell string CS2 may be individually controlled by the word lines WL1[1] to WL1[n] or WL2[1] to WL2[n] separated from each other. For example, when the second cell strings CS2 including the second sub-memory cells are to be selected from among the selected strings, a select voltage $V_{sel}$ for selecting sub-memory cells connected to the second word lines WL2[1] to WL2[n] may be applied to the second word lines WL2[1] to WL2[n], and an unselect voltage $V_{unsel}$ for unselecting sub-memory cells connected to the first word lines WL1[1] to WL1[n] may be applied to the first word lines WL1[1] to WL1[n]. Here, the select voltage and the unselect voltage merely mean voltages applied to word lines in order to select or unselect connected sub-memory cells, respectively, and are not limited to a specific value.

Accordingly, the first cell string CS1 formed by the first sub-memory cells and the second cell string CS2 formed by the second sub-memory cells may be divided and controlled through different word lines WL1 and WL2.

In addition, the first cell string CS1 may be connected to a first source select line SSL1 and a first drain select line DSL1, and the second string CS2 may be connected to a second source select line SSL2 and a second drain select line DSL2.

The plurality of memory cell strings CS may be connected to the common source line CSL in parallel. Each memory cell string CS may be connected to one bit line corresponding thereto among the plurality of bit lines BL. The common source line CSL and the plurality of bit lines BL may be connected to the plurality of memory cell strings CS. For example, the first cell string CS1 and the second cell string CS2 may be connected to the same bit line BL and the same common source line CSL.

Figure 7A:
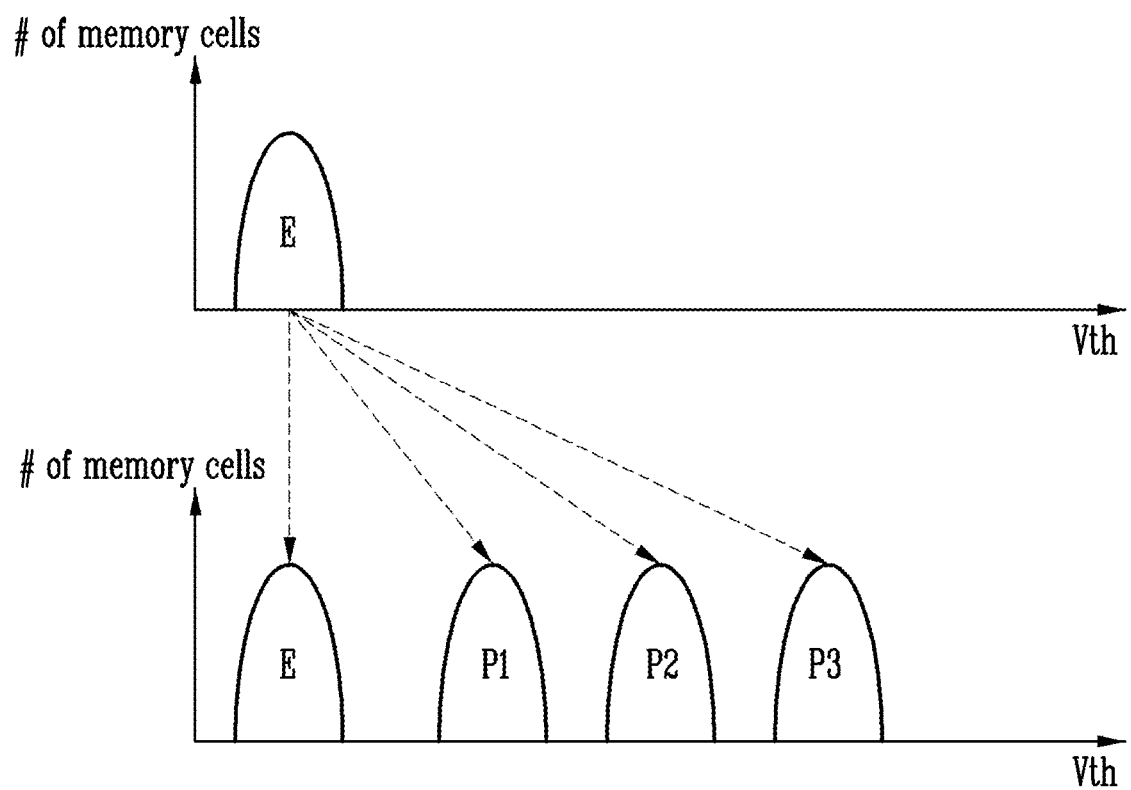
FIGS. 7A and 7B are diagrams illustrating an example of sub-memory cells programmed according to an embodiment of the present disclosure.
Figure 7B:
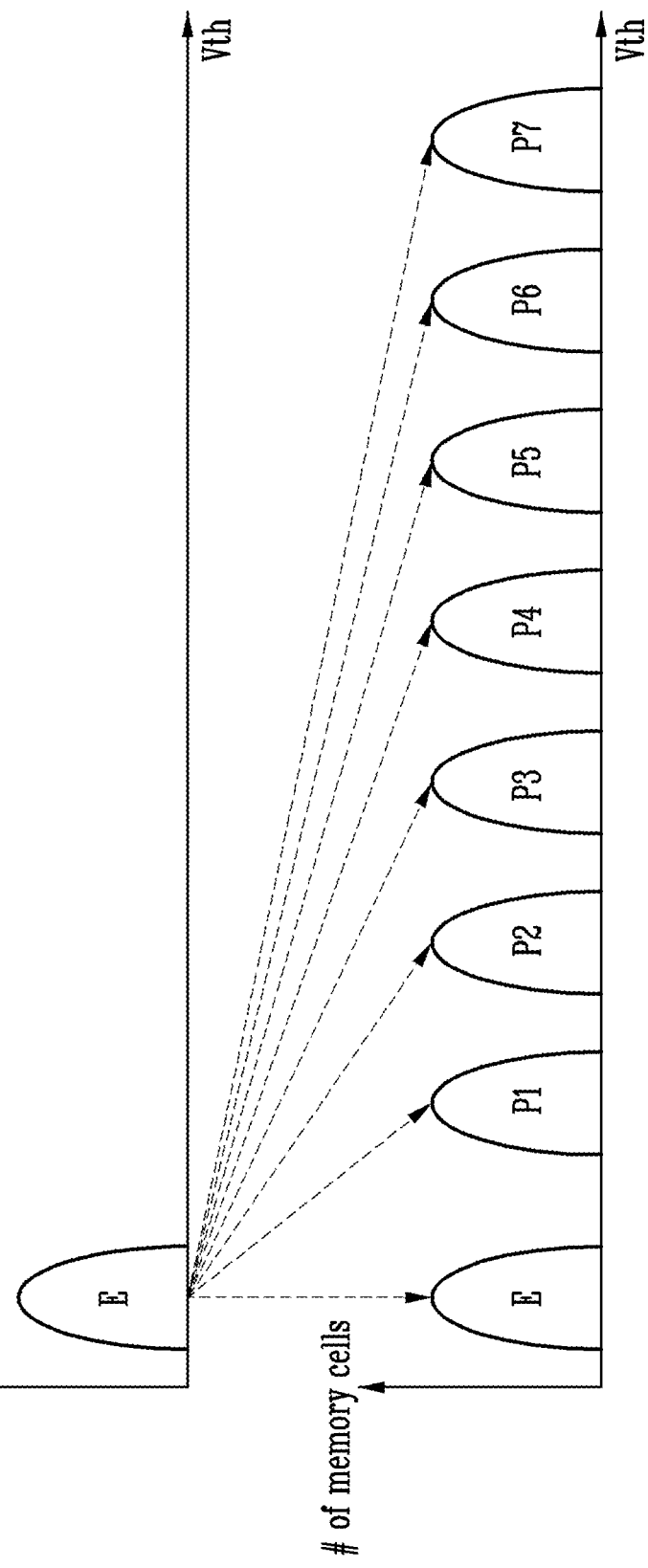

FIGS. 7A and 7B are diagrams illustrating an example of sub-memory cells programmed according to an embodiment of the present disclosure.

Referring to FIGS. 3, 7A, and 7B, the sizes of the first sub-memory cell and the second sub-memory cell may be different from each other, and for example, the size of the second sub-memory cell may be larger than that of the first sub-memory cell. In the present specification, the size of the sub-memory cell may mean the area of a cross-section of the sub-memory cell.

A sub-memory cell with a relatively large size may have a superior cell characteristic than a sub-memory cell with a relatively small size. For example, a sub-memory cell with a relatively large size may have a relatively wide voltage window in which threshold voltage distributions may be disposed. A relatively great number of bits of data may be stored in a memory cell with a wide voltage window. On the other hand, when an attempt is made to store data of the same number of bits in a memory cell with a relatively narrow voltage window, a problem that an interval between program states is too narrow or a targeted threshold voltage exceeds a limit of the memory cell may occur, and thus data having a relatively small number of bits may be stored in the memory cell with the narrow voltage window.

For example, the first sub-memory cells may be programmed from an erase state E to any of the erase state E and first to third program states P1 to P3, as shown in FIG. 7A. That is, the first sub-memory cells may be programmed to have a threshold voltage included in any of the erase state E or the first to third program states P1 to P3.

The second sub-memory cells having the size larger than that of the first sub-memory cells may be programmed from the erase state E to any of the erase state E and first to seventh program states P1 to P7, as shown in FIG. 7B. That is, the second sub-memory cells may be programmed to have a threshold voltage included in any of the erase state E or the first to seventh program states P1 to P7.

The number of bits to be stored in the first sub-memory cell with the relatively small size may be 2 bits. The number of bits to be stored in the second sub-memory cell with the relatively large size may be 3 bits. That is, the number of bits to be stored in the second sub-memory cell with the relatively large size may be greater than that of the first sub-memory cell with the relatively small size.

Figure 8A:
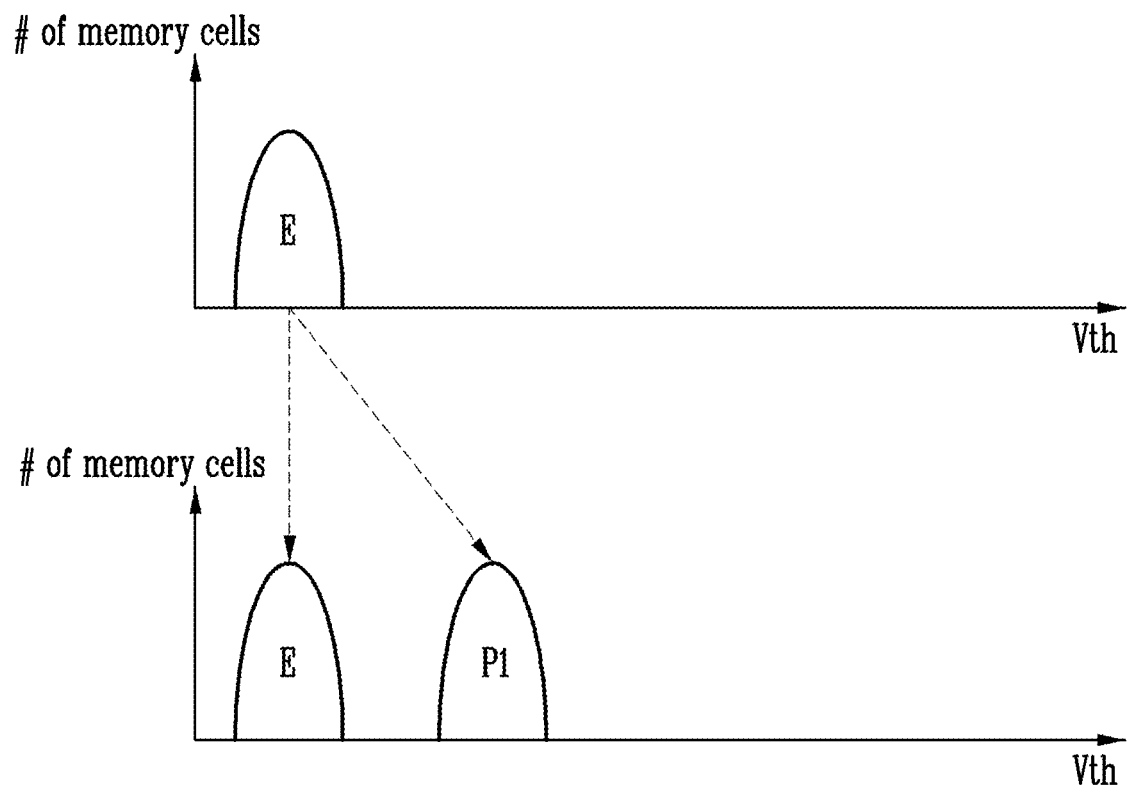
FIGS. 8A and 8B are diagrams illustrating another example of sub-memory cells programmed according to an embodiment of the present disclosure.
Figure 8B:
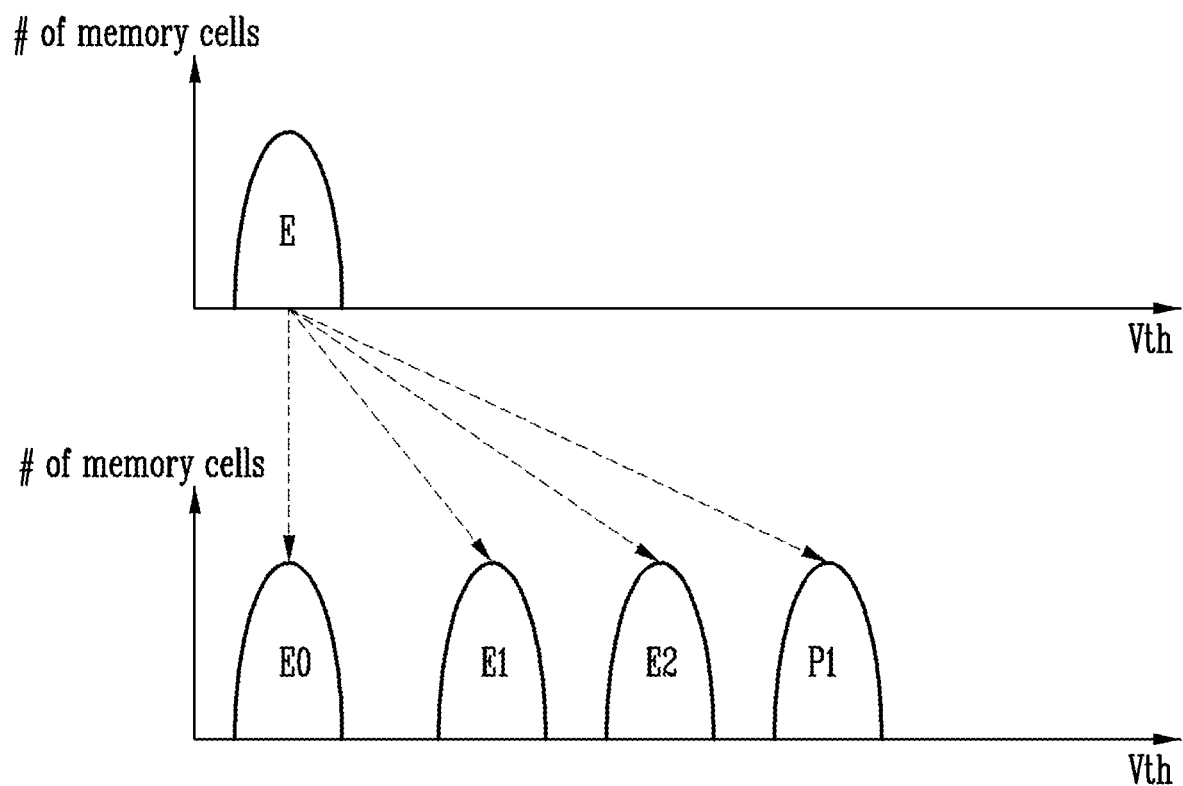

FIGS. 8A and 8B are diagrams illustrating another example of sub-memory cells programmed according to an embodiment of the present disclosure.

Referring to FIGS. 8A and 8B, the first sub-memory cells may be programmed from the erase state E to any of the erase state E and the first program state P1 as shown in FIG. 8A, and the second sub-memory cells may be programmed from the erase state E to any of the first to third erase states E0 to E2 and the first program state.

According to this, both of the number of bits to be stored in the first sub-memory cells and the number of bits to be stored in the second sub-memory cells may be equal to 1 bit. However, the number of threshold voltage distributions corresponding to states in which the first sub-memory cells are to be programmed is two, whereas the number of threshold voltage distributions corresponding to states in which the second sub-memory cells are to be programmed may be different from two as four.

That is, the number of threshold voltage distributions corresponding to the states in which the second sub-memory cells with the relatively large size are to be programmed may be greater than the number of threshold voltage distributions corresponding to the states in which the first sub-memory cells with the relatively small size are to be programmed. In addition, although the number of bits to be stored in the first sub-memory cells and the second sub-memory cells is the same, the number of threshold voltage distributions corresponding to states in which the sub-memory cells are to be programmed may be different from each other.

Figure 9A:
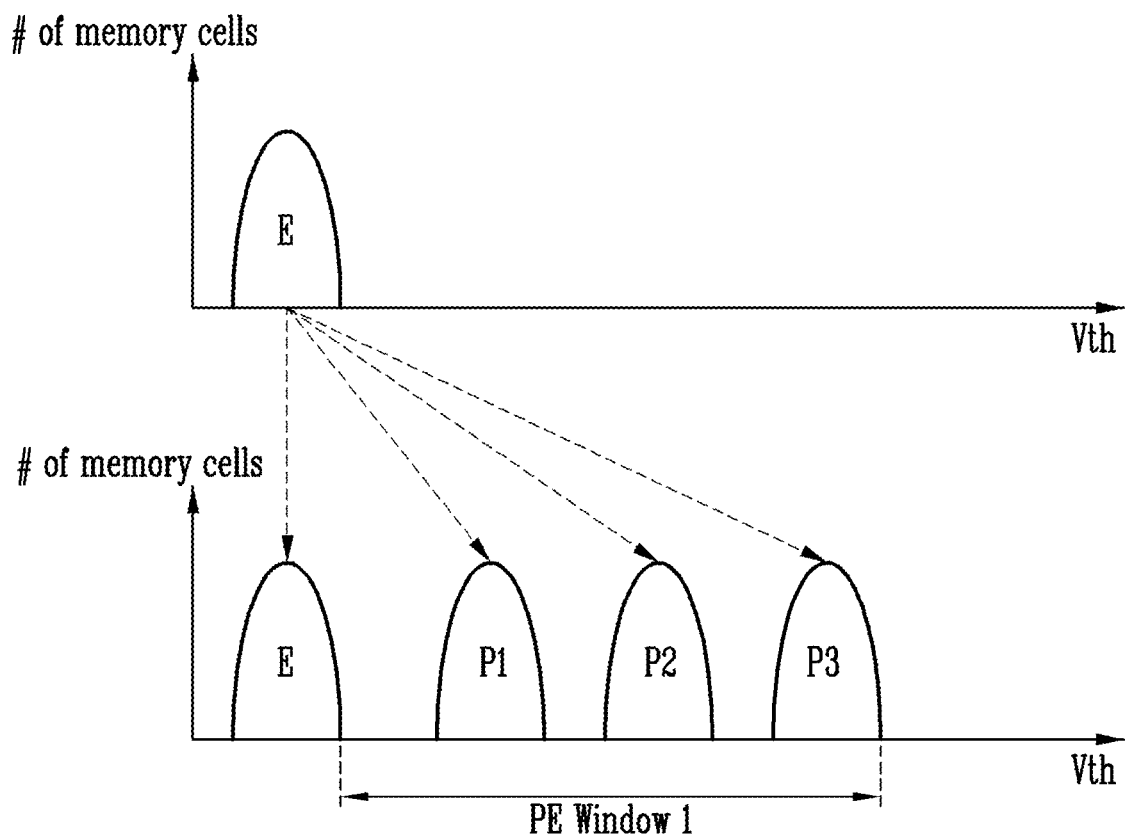
FIGS. 9A and 9B are diagrams illustrating still another example of sub-memory cells programmed according to an embodiment of the present disclosure.
Figure 9B:
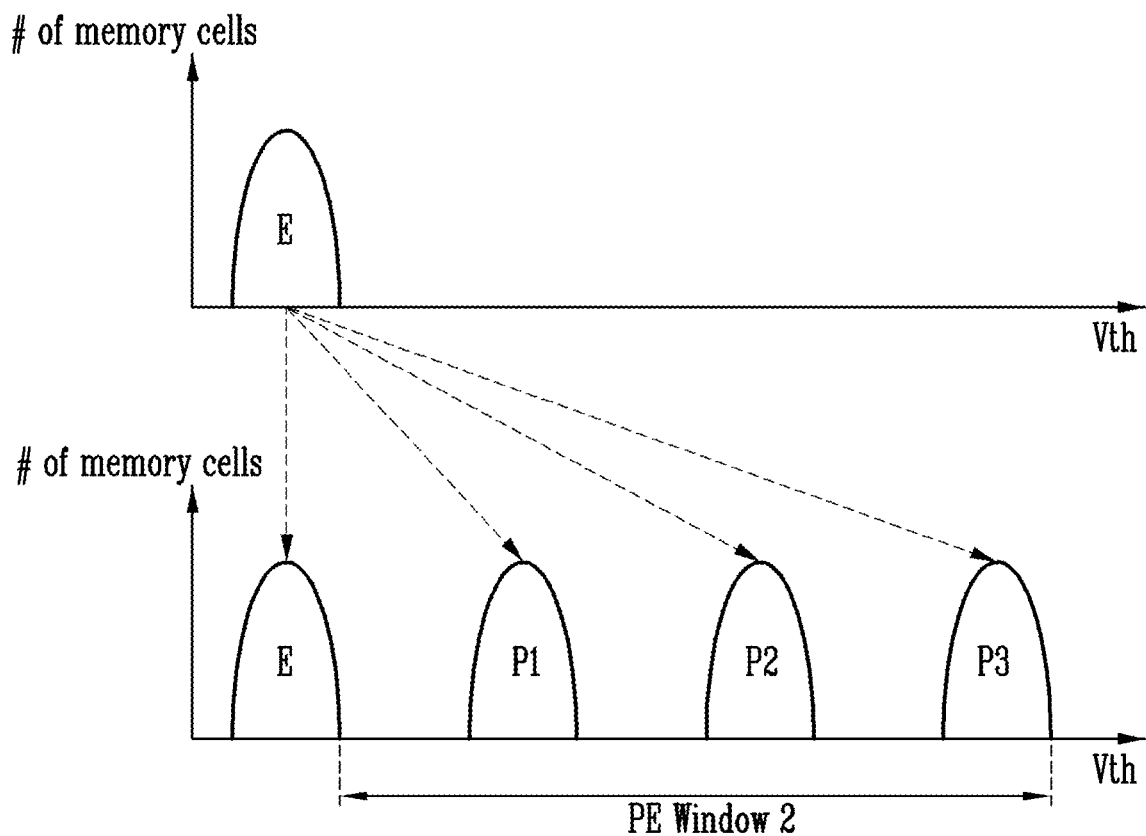

FIGS. 9A and 9B are diagrams illustrating still another example of sub-memory cells programmed according to an embodiment of the present disclosure.

Referring to FIGS. 9A and 9B, the first sub-memory cells may be programmed from the erase state E to any of the erase state E and the first to third program states P1 to P3 as shown in FIG. 9A. That is, the first sub-memory cells may be programmed to have a threshold voltage included in any of the erase state E or the first to third program states P1 to P3.

In addition, the second sub-memory cells may be programmed from the erase state E to any of the erase state E and the first to third program states P1 to P3, as shown in FIG. 9B. That is, the second sub-memory cells may be programmed to have a threshold voltage included in any of the erase state E or the first to third program states P1 to P3.

According to this, both of the number of bits to be stored in the first sub-memory cells and the number of bits to be stored in the second sub-memory cells may be equal to 2 bits. In addition, the number of threshold voltage distributions corresponding to states in which the first sub-memory cells are to be programmed and the number of threshold voltage distributions corresponding to states in which the second sub-memory cells are to be programmed may be equal to four.

However, program/erase windows of the first sub-memory cells and the second sub-memory cells may be different from each other. Here, a width of the program/erase window may be defined as a threshold voltage difference between the erase state and a program state having the highest threshold voltage. For example, as shown in FIGS. 9A and 9B, a section between the highest threshold voltage corresponding to the erase state E and the highest threshold voltage corresponding to the third program state P3, which is a program state having the highest threshold voltage may be defined as the program/erase (PE) window.

That is, the program/erase window of the second sub-memory cells with the relatively large size may be wider than the program/erase window of the first sub-memory cells with the relatively small size. Accordingly, since the second sub-memory cells with the relatively large size have a relatively wide threshold voltage interval between program states, improved program performance may be secured.

Figure 10:
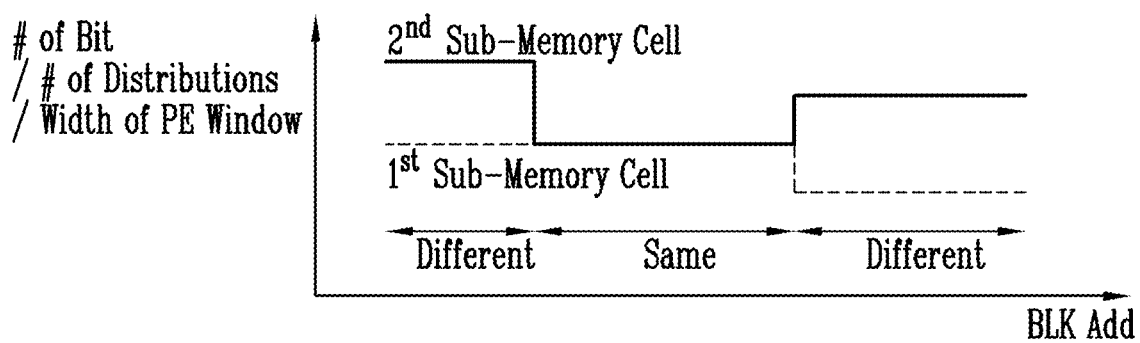
FIG. 10 is a diagram illustrating a method of controlling a memory device according to an embodiment of the present disclosure.

FIG. 10 is a diagram illustrating a method of controlling a memory device according to an embodiment of the present disclosure.

Referring to FIG. 10, program for the first sub-memory cell and the second sub-memory cell may be performed based on an address of a memory block in which the first sub-memory cell and the second sub-memory cell are included. When performing the program, one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell may be set differently or equally according to the address of the memory block in which the first sub-memory cell and the second sub-memory cell are included.

For example, in some memory blocks, a size difference between the first sub-memory cell and the second sub-memory cell may be greater than a predetermined value. In some memory blocks in which the size difference between the first sub-memory cell and the second sub-memory cell is expected to be greater than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set differently.

In some other memory blocks, the size difference between the first sub-memory cell and the second sub-memory cell may be less than the predetermined value. In some memory blocks in which the size difference between the first sub-memory cell and the second sub-memory cell is expected to be less than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set equally to each other.

Figure 11:
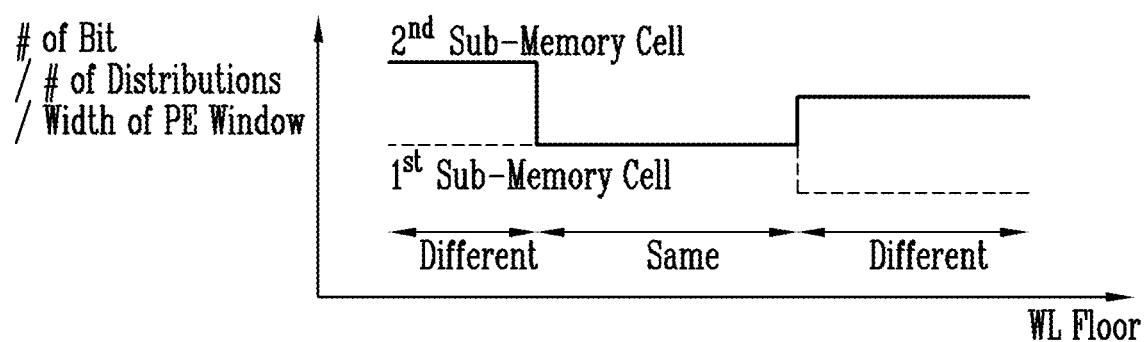
FIG. 11 is a diagram illustrating a method of controlling a memory device according to another embodiment of the present disclosure.

FIG. 11 is a diagram illustrating a method of controlling a memory device according to another embodiment of the present disclosure.

Referring to FIG. 11, program for the first sub-memory cell and the second sub-memory cell may be performed based on the number of layers of the word line in which the first sub-memory cell and the second sub-memory cell are included. Here, the number of layers of the word line may indicate a height of the word line in a direction perpendicular to the substrate. When performing the program, one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell may be set differently or equally according to the number of layers of the word line in which the first sub-memory cell and the second sub-memory cell are included.

For example, in some word lines, the size difference between the first sub-memory cell and the second sub-memory cell may be greater than a predetermined value. In some word lines in which the size difference between the first sub-memory cell and the second sub-memory cell is expected to be greater than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set differently.

In some other word lines, the size difference between the first sub-memory cell and the second sub-memory cell may be less than the predetermined value. In some word lines in which the size difference between the first sub-memory cell and the second sub-memory cell is expected to be less than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set equally to each other.

Figure 12:
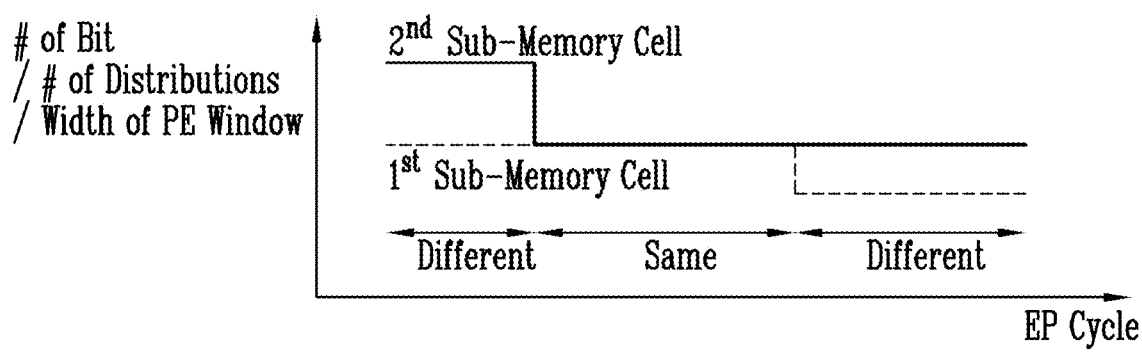
FIG. 12 is a diagram illustrating a method of controlling a memory device according to another embodiment of the present disclosure.

FIG. 12 is a diagram illustrating a method of controlling a memory device according to another embodiment of the present disclosure.

Referring to FIG. 12, program for the first sub-memory cell and the second sub-memory cell may be performed based on the number of erase/program cycles EP Cycle of the memory block in which the first sub-memory cell and the second sub-memory cell are included. When performing the program, one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell may be set differently or equally according to the number of erase/program cycles of the memory block in which the first sub-memory cell and the second sub-memory cell are included.

For example, when the number of erase/program cycles falls within a partial range, a difference in deterioration level of the first sub-memory cell and the second sub-memory cell may exceed a predetermined range. In the number of erase/program cycles in which the difference in deterioration level of the first sub-memory cell and the second sub-memory cell is expected to be out of the predetermined range, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set differently.

When the number of erase/program cycles is out of the above-described partial range, the difference in deterioration level of the first sub-memory cell and the second sub-memory cell may be within the predetermined range. In the number of erase/program cycles in which the difference in deterioration level of the first sub-memory cell and the second sub-memory cell is expected to be within the predetermined range, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set equally.

Figure 13:
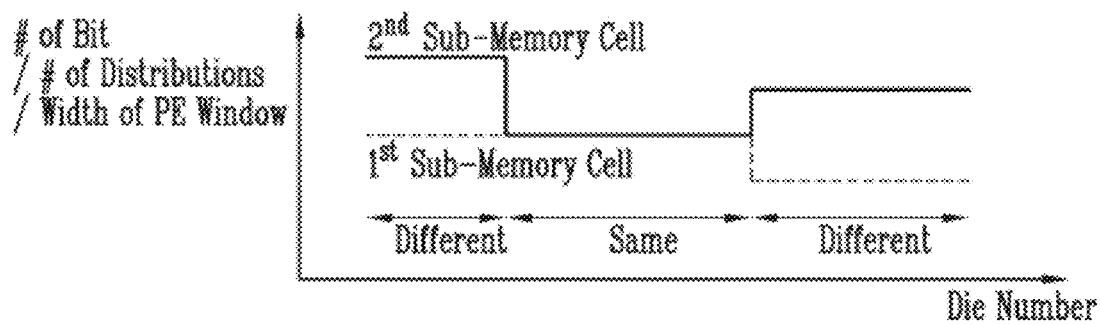
FIG. 13 is a diagram illustrating a method of controlling a memory device according to still another embodiment of the present disclosure.

FIG. 13 is a diagram illustrating a method of controlling a memory device according to still another embodiment of the present disclosure.

Referring to FIG. 13, program for the first sub-memory cell and the second sub-memory cell may be performed based on a position of a die in which the first sub-memory cell and the second sub-memory cell are included. When performing the program, one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell may be set differently or equally according to the position of the die in which the first sub-memory cell and the second sub-memory cell are included.

For example, in some dies, the size difference between the first sub-memory cell and the second sub-memory cell may be greater than a predetermined value. In some dies in which the size difference between the first sub-memory cell and the second sub-memory cell is expected to be greater than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set differently.

In some other dies, the size difference between the first sub-memory cell and the second sub-memory cell may be less than the predetermined value. In some dies in which the size difference between the first sub-memory cell and the second sub-memory cell is expected to be less than the predetermined value, the program may be performed so that one or more of the number of bits to be stored in the first sub-memory cell and the second sub-memory cell, the number of threshold voltage distributions of the first sub-memory cell and the second sub-memory cell, and the program/erase window width of the first sub-memory cell and the second sub-memory cell are set equally to each other.

Figure 14:
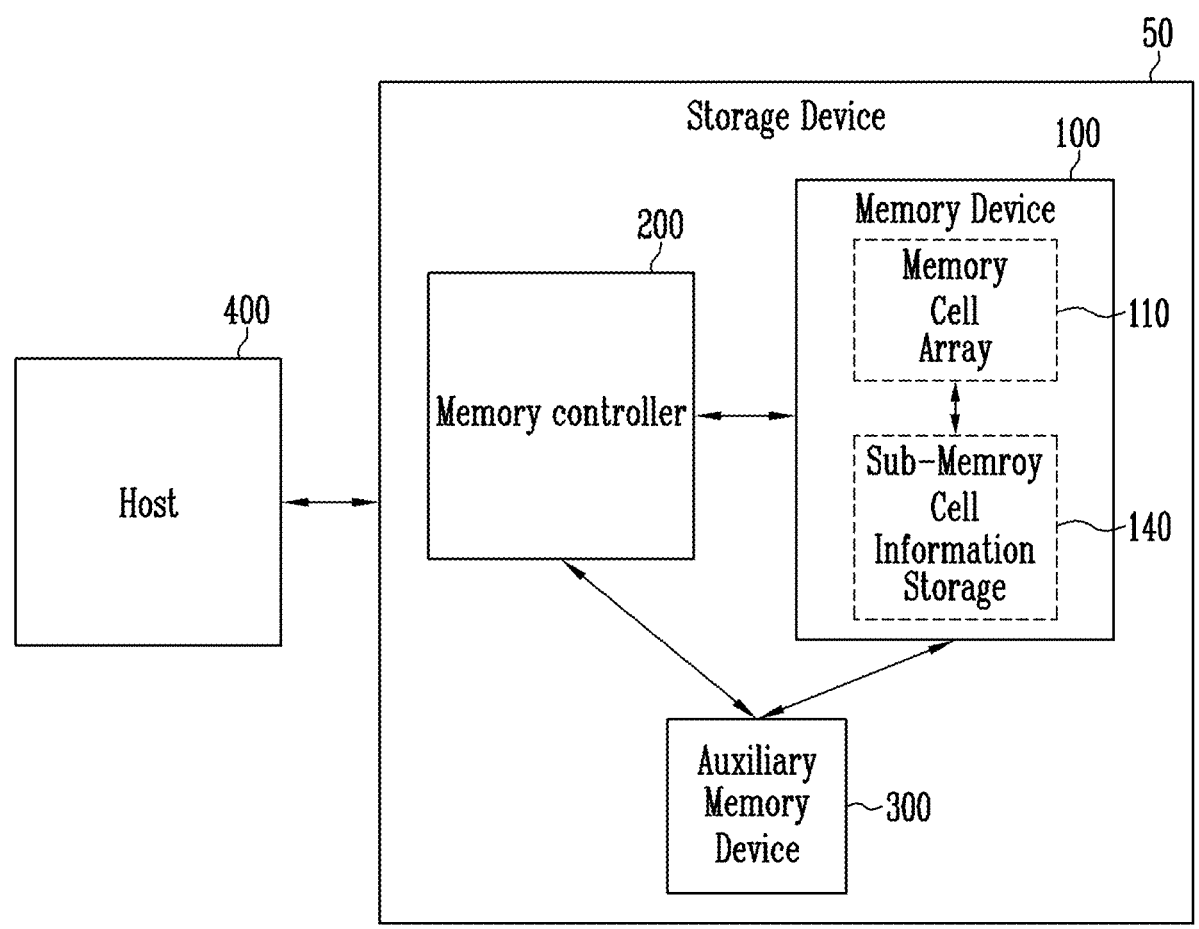
FIG. 14 is a block diagram illustrating a storage device according to an embodiment of the present disclosure.

FIG. 14 is a block diagram illustrating a storage device 50 according to an embodiment of the present disclosure.

Referring to FIG. 14, the storage device 50 may include a memory device 100, a memory controller 200 and an auxiliary memory device 300.

The storage device 50 may be a device that stores data under control of a host 400, such as a mobile phone, a smartphone, an MP3 player, a laptop computer, a desktop computer, a game machine, a display device, a tablet PC, or an in-vehicle infotainment system. The storage device 50 may be implemented as one of various types of storage devices according to a host interface, which is a communication method with the host 400. The storage device 50 may be implemented as any of various types of packages.

The memory device 100 may store data or use stored data. In an embodiment, the memory device 100 may be the memory device 100 of FIG. 1. Specifically, the memory device 100 may operate in response to control of the memory controller 200. The memory device 100 may be a nonvolatile memory device or a volatile memory device.

The memory device 100 may include a memory cell array 110 including a plurality of memory cells. The memory cell array 110 may include a plurality of memory blocks. Each memory block may include a plurality of memory cells, and one memory block may include a plurality of pages. Here, a page may be one unit for storing data in the memory device 100 or reading data stored in the memory device 100. Each of the memory cells may include the first sub-memory cell and the second sub-memory cell having a size larger than that of the first sub-memory cell. In an embodiment, the first sub-memory cell may be connected to a first channel extending in a direction in which the memory cells are stacked, and the second sub-memory cells may be connected to a second channel extending in the direction in which the memory cells are stacked. The first channel and the second channel may be physically separated from one channel structure extending in the direction in which the memory cells are stacked.

In addition, the memory device 100 may include the sub-memory cell information storage 140. Sub-memory cell size information on the sizes of the first sub-memory cell and the second sub-memory cell may be stored in the sub-memory cell information storage 140.

The memory device 100 may receive a command and an address from the memory controller 200. The memory device 100 may be configured to access an area selected by the received address of the memory cell array. Accessing the selected area may mean performing an operation corresponding to the received command on the selected area. For example, the memory device 100 may perform a write operation (program operation), a read operation, and an erase operation. Here, the program operation may be an operation in which the memory device 100 writes data to the area selected by the address. The read operation may mean an operation in which the memory device 100 reads data from the area selected by the address. The erase operation may mean an operation in which the memory device 100 erases data stored in the area selected by the address.

The memory controller 200 may control an overall operation of the storage device 50. Specifically, when power is applied to the storage device 50, the memory controller 200 may execute firmware (FW). The firmware FW may include a host interface layer HIL that receives a request input from the host 400 or outputs a response to the host 400, a flash translation layer (FTL) that manages an operation between an interface of the host 400 and an interface of the memory device 100, and a flash interface layer (FIL) that provides a command to the memory device 100 or receives the response from the memory device 100.

The memory controller 200 may receive data and a logical address (LA) from the host 400, and may map the LA into a physical address (PA) indicating an address of memory cells in which data included in the memory device 100 is to be stored. The LA may be a logical block address (LBA), and the PA may be a physical block address (PBA).

The memory controller 200 may control the memory device 100 to perform the program operation, the read operation, or the erase operation according to the request of the host 400. During the program operation, when receiving a write request from the host 400, the memory controller 200 may control the memory device 100 to perform the program operation corresponding to the write request. More specifically, the memory controller 200 may provide a program command, a PBA, and data to the memory device 100.

The memory controller 200 may control the memory device 100 to perform the program operation, the read operation, or the erase operation by itself regardless of the request from the host 400. For example, the memory controller 200 may control the memory device 100 to perform the program operation, the read operation, or the erase operation used to perform a background operation such as wear leveling, garbage collection, or read reclaim.

The auxiliary memory device 300 may be positioned inside the memory controller 200 or outside the memory controller 200. The auxiliary memory device 300 may be, for example, a buffer memory or a cache memory, but is not limited thereto. The auxiliary memory device 300 may include a volatile memory device or a nonvolatile memory device, for example, a double data rate synchronous dynamic random access memory (DDR SDRAM), a DDR4 SDRAM, a low power double data rate 4 (LPDDR4) SDRAM, a graphics double data rate (GDDR) SDRAM, a low power DDR (LPDDR), or Rambus dynamic random access memory (RDRAM).

The memory controller 200 may control the memory device 100 and the auxiliary memory device 300 to load the sub-memory cell size information, which is stored in the sub-memory cell information storage 140 in the memory device 100, into the auxiliary memory device 300. When the memory controller 200 receives the write request requesting to store data in the memory device 100 and write data corresponding to the write request from the external host 400, the memory controller 200 may store the write data in the memory device 100 based on the sub-memory cell size information loaded into the auxiliary memory device 300.

The memory controller 200 may store the write data in the memory device 100 while further considering information on the memory block. In an embodiment, information on an address of the memory blocks in the memory device 100 may be loaded into the auxiliary memory device 300, and the memory controller 200 may store the write data in the memory device 100 by referring to the information on the address of the memory blocks loaded into the auxiliary memory device 300.

The memory controller 200 may store the write data in the memory device 100 while further considering information on the word line. In an embodiment, information on the number of layers of the word line in the memory device 100 may be loaded into the auxiliary memory device 300, and the memory controller 200 may store the write data in the memory device 100 by referring to the information on the number of layers of the word lines loaded into the auxiliary memory device 300.

The memory controller 200 may store the write data in the memory device 100 while further considering information on an erase/program cycle. In an embodiment, information on the number of erase/program cycles of the memory blocks in the memory device 100 may be loaded into the auxiliary memory device 300, and the memory controller 200 may store the write data in the memory device 100 by referring to the information on the number of erase/program cycles loaded into the auxiliary memory device 300.

The memory device 100 may include a plurality of dies, and the memory controller 200 may store the write data in the memory device 100 while further considering information of the die. In an embodiment, information on a position of the dies in the memory device 100 may be loaded into the auxiliary memory device 300, and the memory controller 200 may store the write data in the memory device 100 by referring to the information on the position of the dies loaded into the auxiliary memory device 300.

In an embodiment, the memory controller 200 may control the memory device 100 so that the number of bits to be stored in the second sub-memory cells having the relatively large size is greater than the number of bits to be stored in the first sub-memory cells having the relatively small size.

In another embodiment, the memory controller 200 may control the memory device 100 so that the numbers of threshold voltage distributions corresponding to states in which the second sub-memory cells having the relatively large size are to be programmed is greater than the number of threshold voltage distributions corresponding to states in which the first sub-memory cells having the relatively small size are to be programmed.

In still another embodiment, the memory controller 200 may control the memory device 100 so that the program/erase window of the second sub-memory cells having the relatively large size is greater than the program/erase window of the first sub-memory cells having the relatively small size.

The host 400 may communicate with the storage device 50 using at least one of various communication methods. The host 400 may provide a command, an address, and data to the storage device 50.

Figure 15:
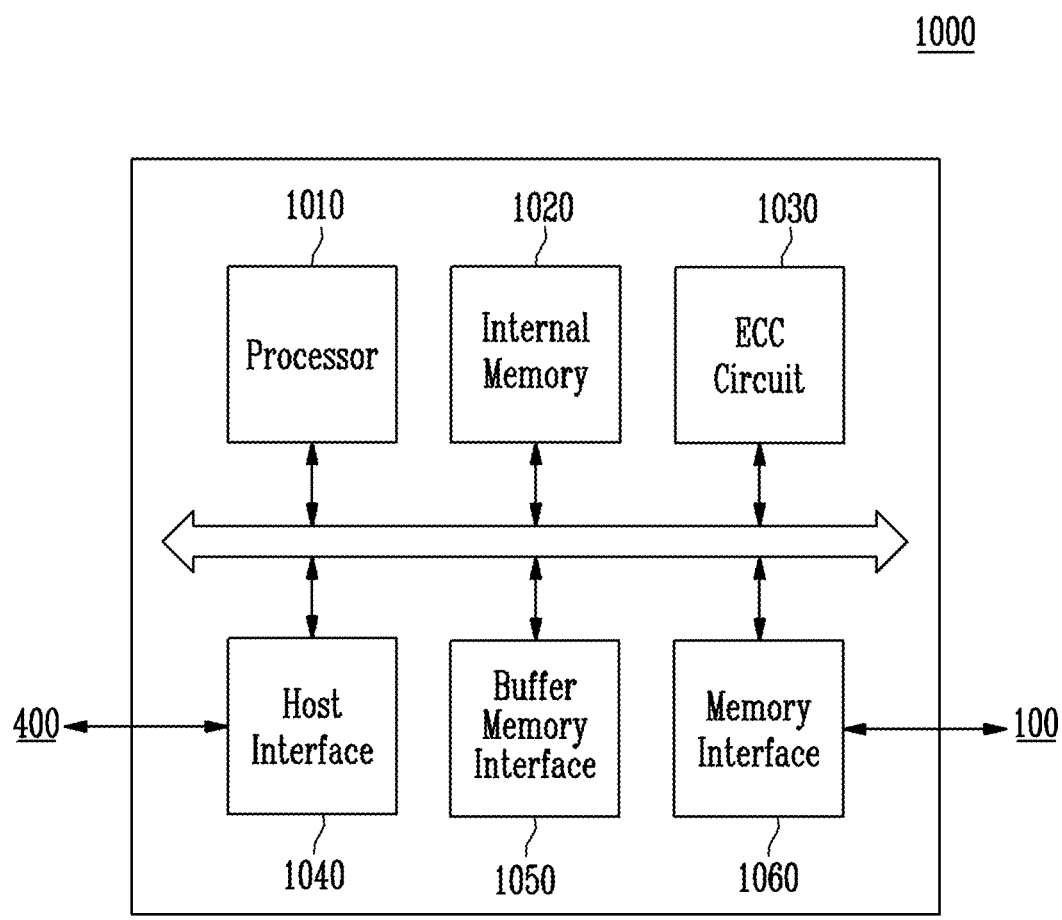
FIG. 15 is a diagram illustrating another embodiment of a memory controller of FIG. 14.

FIG. 15 is a diagram illustrating another embodiment of the memory controller 1000 of FIG. 14.

Referring to FIG. 15, the memory controller 1000 may include a processor 1010, an internal memory 1020, an error correction circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). The processor 1010 may control a subsequent operation for the memory device 100 based on a verification result received from the memory device 100 by the memory interface 1060.

The internal memory 1020 may store various pieces of information necessary for an operation of the memory controller 1000. For example, the internal memory 1020 may include logical and physical address map tables. In an embodiment, the internal memory 1020 may function as the auxiliary memory device 300 of FIG. 14. In this case, the sub-memory cell size information may be loaded into the internal memory 1020. In addition, the information on the address of the memory blocks in the memory device 100, the information on the number of layers of the word lines in the memory device 100, the information on the number of erase/program cycles of the memory blocks in the memory device 100, and/or the information on the position of the dies in the memory device 100 may be loaded into the internal memory 1020.

The error correction circuit 1030 is configured to detect and correct an error of data received from the memory device 100 using an error correction code (ECC). The processor 1010 may adjust a read voltage according to an error detection result of the error correction circuit 1030 and control the memory device 100 to perform re-reading. In an embodiment, an error correction block may be provided as a component of the memory controller 1000.

The host interface 1040 may exchange a command, an address, data, and the like between the memory controller 1000 and the host 400. For example, the host interface 1040 may receive a request, an address, data, and the like from the host 400, and may output data read from the memory device 100 to the host 400. The host interface 1040 may communicate with the host 400 using various protocols. In an embodiment, the host interface 1040 may receive the write request, the write data, and an address where the write data is to be stored from the host 400.

The buffer memory interface 1050 may transmit data between the processor 1010 and a buffer memory (not shown). The buffer memory (not shown) may be used as an operation memory or a cache memory of the memory controller 1000 and may store data used in the storage device. The buffer memory may be used as a read buffer, a write buffer, a map buffer, and the like by the processor 1010. In an embodiment, the buffer memory may function as the auxiliary memory device 300 of FIG. 14. In this case, the sub-memory cell size information may be loaded into the buffer memory, and the buffer memory interface 1050 may store the sub-memory cell size information read from the memory device 100 in the buffer memory. In addition, the information on the address of the memory blocks in the memory device 100, the information on the number of layers of the word lines in the memory device 100, the information on the number of erase/program cycles of the memory blocks in the memory device 100, and/or the information on the position of the dies in the memory device 100 may also be loaded into the buffer memory by the buffer memory interface 1050. When the buffer memory is included in the memory controller 1000, the buffer memory interface 1050 may be omitted.

The memory interface 1060 may exchange the command, the address, the data, and the like between the memory controller 1000 and the memory device 100. For example, the memory interface 1060 may transmit the command, the address, the data, and the like to the memory device 100 and may receive the data and the like from the memory device 100 through a channel. The memory interface 1060 may perform the program operation on the memory device 100 according to an instruction of the processor 1010. In an embodiment, the memory interface 1060 may receive the sub-memory cell size information from the memory device 100 according to instruction of the processor 1010. In addition, the memory interface 1060 may store the write data in the memory device 100 according to the instruction of the processor 1010. In addition, the memory interface 1060 may receive a result of the program operation from the memory device 100.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A memory device comprising:
a memory cell array including memory cells stacked in a direction perpendicular to a substrate, each of the memory cells including a first sub-memory cell and a second sub-memory cell having a size larger than a size of the first sub-memory cell;
a sub-memory cell information storage storing sub-memory cell size information on the sizes of the first sub-memory cell and the second sub-memory cell;
a peripheral circuit configured to perform a program operation on a selected sub-memory cell among the memory cells; and
a control logic configured to control the peripheral circuit to store data in each of the first sub-memory cell and the second sub-memory cell based on the sub-memory cell size information stored in the sub-memory cell information storage,
wherein the control logic based on the sub-memory cell size information stored in the sub-memory cell information storage programs the second sub-memory cells having the larger size with a greater number of program states than the first sub-memory cells,
wherein at least a portion of the plurality of first sub-memory cells is connected to a first channel extending in the direction perpendicular to the substrate, and
wherein at least a portion of the plurality of second sub-memory cells is connected to a second channel extending in the direction perpendicular to the substrate.

2. The memory device of claim 1, wherein the first channel and the second channel are separated from one channel structure extending in the direction perpendicular to the substrate.

3. The memory device of claim 1, wherein the peripheral circuit performs the program operation on each of the first sub-memory cells and the second sub-memory cells to make them have a threshold voltage corresponding to a state among a plurality of states including an erase state and one or more program states.

4. The memory device of claim 3, wherein the control logic controls the peripheral circuit so that a number of bits to be stored in the second sub-memory cell is greater than a number of bits to be stored in the first sub-memory cell.

5. The memory device of claim 3, wherein the control logic controls the peripheral circuit so that a number of threshold voltage distributions corresponding to states in which the second sub-memory cells are to be programmed is greater than a number of threshold voltage distributions corresponding to states in which the first sub-memory cells are to be programmed.

6. The memory device of claim 3, wherein the control logic controls the peripheral circuit so that a threshold voltage difference between the erase state and a program state, in which a threshold voltage is the highest, of the second sub-memory cells is greater than a threshold voltage difference between the erase state and a program state, in which a threshold voltage is the highest, of the first sub-memory cells.

7. The memory device of claim 1, wherein the control logic controls the peripheral circuit to store the data in the first sub-memory cell and the second sub-memory cell based on an address of a memory block including the first sub-memory cell and the second sub-memory cell.

8. The memory device of claim 1, wherein the control logic controls the peripheral circuit to store the data in the first sub-memory cell and the second sub-memory cell based on a height of a word line coupled to the first sub-memory cell and the second sub-memory cell, the height being in the direction perpendicular to the substrate.

9. The memory device of claim 1, wherein the control logic controls the peripheral circuit to store the data in the first sub-memory cell and the second sub-memory cell based on a number of erase/program cycles of a memory block including the first sub-memory cell and the second sub-memory cell.

10. The memory device of claim 1, wherein the control logic controls the peripheral circuit to store the data in the first sub-memory cell and the second sub-memory cell based on a position of a die including the first sub-memory cell and the second sub-memory cell.

11. The memory device of claim 1, wherein the first sub-memory cell and the second sub-memory cell are connected to different drain select lines.

12. The memory device of claim 1, wherein the first sub-memory cell and the second sub-memory cell are connected to different bit lines.

13. The memory device of claim 1, wherein the first sub-memory cell and the second sub-memory cell are connected to different word lines.

14. A storage device comprising:
- a memory device including memory cells each including a first sub-memory cell and a second sub-memory cell having a size larger than a size of the first sub-memory cell, and a sub-memory cell information storage storing sub-memory cell size information on the sizes of the first sub-memory cell and the second sub-memory cell; and
- a memory controller configured to:
- receive a write request for requesting to store data in the memory device and write data corresponding to the write request,
- control the memory device to store therein the write data based on the sub-memory cell size information stored in the sub-memory cell information storage, and
- control the memory device to store the second sub-memory cells having the larger size with a greater number of program states than the first sub-memory cells, based on the sub-memory cell size information stored in the sub-memory cell information storage,
- wherein at least a portion of the first sub-memory cells included in the memory cells is connected to a first channel extending in a direction in which the memory cells are stacked, and
- wherein at least a portion of the second sub-memory cells included in the memory cells is connected to a second channel extending in the direction in which the memory cells are stacked.

15. The storage device of claim 14, wherein the first channel and the second channel are separated from one channel structure.

16. The storage device of claim 14, wherein the memory controller controls the memory device so that a number of bits to be stored in the second sub-memory cell is greater than a number of bits to be stored in the first sub-memory cell.

17. The storage device of claim 14, wherein the memory controller controls the memory device so that a number of threshold voltage distributions corresponding to states in which the second sub-memory cells are to be programmed is greater than a number of threshold voltage distributions corresponding to states in which the first sub-memory cells are to be programmed.

18. The storage device of claim 14, wherein the memory controller controls the memory device so that a threshold voltage difference between an erase state and a program state, in which a threshold voltage is the highest, of the second sub-memory cells is greater than a threshold voltage difference between an erase state and a program state, in which a threshold voltage is the highest, of the first sub-memory cells.

19. The storage device of claim 14, further comprising an auxiliary memory device, and
- wherein the memory controller is further configured to control the memory device to load the sub-memory cell size information into the auxiliary memory device.

20. A memory device comprising:
- a memory cell structure physically divided into first and second sub-memory cells of physically different sizes;
- a sub-memory cell information storage storing sub-memory cell size information on the sizes of the first sub-memory cell and the second sub-memory cell; and
- a control circuit configured to perform, based on the sub-memory cell size information stored in the sub-memory cell information storage, the second sub-memory cells having the larger size with a greater number of program states than the first sub-memory cells,
- wherein the first and second sub-memory cells are coupled to respective first and second sub-channels, which are physically divided from a channel structure coupled to the memory cell structure.

* * * * *